United States Patent
Myerberg et al.

(10) Patent No.: US 10,232,443 B2
(45) Date of Patent: Mar. 19, 2019

(54) FUSED FILAMENT FABRICATION

(71) Applicant: Desktop Metal, Inc., Burlington, MA (US)

(72) Inventors: Jonah Samuel Myerberg, Lexington, MA (US); Ricardo Fulop, Lexington, MA (US); Michael Andrew Gibson, Boston, MA (US); Anastasios John Hart, Waban, MA (US); Richard Remo Fontana, Cape Elizabeth, ME (US); Christopher Allan Schuh, Wayland, MA (US); Yet-Ming Chiang, Weston, MA (US); Matthew David Verminski, North Andover, MA (US); Emanuel Michael Sachs, Newton, MA (US); Ricardo Chin, Shrewsbury, MA (US)

(73) Assignee: DESKTOP METAL, INC., Burlington, MA (US)

(*) Notice: Subject to any disclaimer, the term of this patent is extended or adjusted under 35 U.S.C. 154(b) by 0 days.

(21) Appl. No.: 16/023,957

(22) Filed: Jun. 29, 2018

(65) Prior Publication Data

US 2018/0318932 A1 Nov. 8, 2018

Related U.S. Application Data

(63) Continuation of application No. 15/382,565, filed on Dec. 16, 2016.
(Continued)

(51) Int. Cl.
*B22F 3/24* (2006.01)
*B33Y 50/02* (2015.01)
(Continued)

(52) U.S. Cl.
CPC ............... *B22F 3/24* (2013.01); *B22F 3/008* (2013.01); *B22F 3/1055* (2013.01); *B22F 3/115* (2013.01);
(Continued)

(58) Field of Classification Search
CPC .......... B22F 2003/1058; B29C 64/106; B29C 64/40
See application file for complete search history.

(56) References Cited

U.S. PATENT DOCUMENTS

| 3,874,207 A | 4/1975 | Lemelson |
| 4,754,900 A | 7/1988 | MacKay et al. |

(Continued)

FOREIGN PATENT DOCUMENTS

| CN | 104669623 | 6/2015 |
| EP | 3117982 | 1/2017 |

(Continued)

OTHER PUBLICATIONS

Chang et al, Advances in powder metallurgy, Woodhead Publishing, 2013, pp. 186-187. (Year: 2013).*

(Continued)

*Primary Examiner* — James Sanders
(74) *Attorney, Agent, or Firm* — Wiggin and Dana LLP; Joseph Casino; Andrew D. Bochner

(57) ABSTRACT

A printer fabricates an object from a computerized model using a fused filament fabrication process. The shape of an extrusion nozzle may be varied during extrusion to control, e.g., an amount of build material deposited, a shape of extrudate exiting the nozzle, a feature resolution, and the like.

24 Claims, 10 Drawing Sheets

Related U.S. Application Data

(60) Provisional application No. 62/268,458, filed on Dec. 16, 2015, provisional application No. 62/303,310, filed on Mar. 3, 2016, provisional application No. 62/322,760, filed on Apr. 14, 2016.

(51) Int. Cl.
| | | |
|---|---|---|
| *B33Y 30/00* | (2015.01) | |
| *B33Y 10/00* | (2015.01) | |
| *B22F 3/115* | (2006.01) | |
| *B22F 3/00* | (2006.01) | |
| *B22F 3/105* | (2006.01) | |
| *B29C 64/106* | (2017.01) | |
| *B22F 9/00* | (2006.01) | |
| *B29K 505/00* | (2006.01) | |
| *B29K 509/08* | (2006.01) | |
| *B29K 105/16* | (2006.01) | |
| *B29C 64/40* | (2017.01) | |
| *B29K 101/12* | (2006.01) | |

(52) U.S. Cl.
CPC ............ *B29C 64/106* (2017.08); *B33Y 10/00* (2014.12); *B33Y 30/00* (2014.12); *B33Y 50/02* (2014.12); *B22F 9/007* (2013.01); *B22F 2003/1057* (2013.01); *B22F 2003/247* (2013.01); *B22F 2203/11* (2013.01); *B29C 64/40* (2017.08); *B29K 2101/12* (2013.01); *B29K 2105/16* (2013.01); *B29K 2505/00* (2013.01); *B29K 2509/08* (2013.01); *Y02P 10/295* (2015.11)

(56) References Cited

U.S. PATENT DOCUMENTS

| | | | |
|---|---|---|---|
| 5,065,695 A | 11/1991 | Baron et al. | |
| 5,121,329 A | 6/1992 | Crump | |
| 5,182,056 A | 1/1993 | Spence et al. | |
| 5,204,055 A | 4/1993 | Sachs et al. | |
| 5,242,098 A | 9/1993 | Hardwick et al. | |
| 5,340,433 A | 8/1994 | Crump | |
| 5,496,682 A | 3/1996 | Mirle et al. | |
| 5,503,785 A * | 4/1996 | Crump ................... | B33Y 10/00 264/308 |
| 5,580,940 A | 12/1996 | Oosterhoff et al. | |
| 5,738,817 A | 4/1998 | Danforth et al. | |
| 5,752,155 A | 5/1998 | Gates et al. | |
| 5,872,158 A | 2/1999 | Kuczynski et al. | |
| 5,893,404 A | 4/1999 | Brown et al. | |
| 5,900,207 A | 5/1999 | Danforth et al. | |
| 6,033,788 A | 3/2000 | Cawley et al. | |
| 6,054,077 A | 4/2000 | Comb et al. | |
| 6,117,612 A | 9/2000 | Halloran et al. | |
| 6,183,689 B1 | 2/2001 | Roy et al. | |
| 6,202,734 B1 | 3/2001 | Sackinger et al. | |
| 6,512,216 B2 | 1/2003 | Gedevanishvili et al. | |
| 6,519,500 B1 | 2/2003 | White | |
| 6,547,995 B1 | 4/2003 | Comb et al. | |
| 6,596,224 B1 | 7/2003 | Sachs et al. | |
| 6,722,872 B1 | 4/2004 | Swanson et al. | |
| 6,799,959 B1 | 10/2004 | Tochimoto et al. | |
| 6,805,835 B2 | 10/2004 | Roy et al. | |
| 6,850,334 B1 | 2/2005 | Gothait | |
| 6,974,656 B2 | 12/2005 | Hinczewski | |
| 7,297,304 B2 | 11/2007 | Swanson et al. | |
| 7,795,349 B2 | 9/2010 | DiCologero et al. | |
| 7,897,074 B2 | 3/2011 | Batchelder et al. | |
| 7,942,987 B2 | 5/2011 | Zinniel et al. | |
| 8,033,811 B2 | 10/2011 | Swanson et al. | |
| 8,215,371 B2 | 7/2012 | Batchelder | |
| 8,591,801 B2 | 11/2013 | Tsutsui et al. | |
| 8,765,045 B2 | 7/2014 | Zinniel et al. | |
| 8,813,817 B2 | 8/2014 | Poole et al. | |
| 8,827,684 B1 * | 9/2014 | Schumacher ........... | B29C 64/20 425/375 |
| 9,027,378 B2 | 5/2015 | Zinniel et al. | |
| 9,044,805 B2 | 6/2015 | Poole et al. | |
| 9,101,977 B2 | 8/2015 | Waniuk et al. | |
| 9,103,009 B2 | 8/2015 | Prest et al. | |
| 9,120,270 B2 | 9/2015 | Zhou et al. | |
| 9,126,365 B1 | 9/2015 | Gozdz et al. | |
| 9,138,981 B1 | 9/2015 | Napadensky et al. | |
| 9,168,698 B2 | 10/2015 | Schmehl et al. | |
| 9,327,448 B2 | 5/2016 | Shah et al. | |
| 9,399,322 B2 | 7/2016 | Mulliken | |
| 9,610,650 B2 | 4/2017 | Roberts et al. | |
| 9,956,650 B2 | 5/2018 | Nako et al. | |
| 2003/0010409 A1 | 1/2003 | Kunze et al. | |
| 2003/0185698 A1 | 10/2003 | Wang et al. | |
| 2004/0184944 A1 | 9/2004 | Geving et al. | |
| 2004/0239009 A1 | 12/2004 | Collins et al. | |
| 2005/0112015 A1 | 5/2005 | Bampton et al. | |
| 2005/0249627 A1 | 11/2005 | Wang et al. | |
| 2006/0185473 A1 | 8/2006 | Withers et al. | |
| 2008/0317894 A1 | 12/2008 | Turley et al. | |
| 2009/0148813 A1 | 6/2009 | Sun et al. | |
| 2009/0263582 A1 | 10/2009 | Batchelder et al. | |
| 2010/0021580 A1 | 1/2010 | Swanson et al. | |
| 2010/0193998 A1 | 8/2010 | Crump et al. | |
| 2011/0176952 A1 | 7/2011 | Kruzhanov et al. | |
| 2013/0170171 A1 | 7/2013 | Wicker et al. | |
| 2013/0241102 A1 | 9/2013 | Rodgers et al. | |
| 2013/0306198 A1 | 11/2013 | Prest et al. | |
| 2014/0048969 A1 | 2/2014 | Swanson et al. | |
| 2014/0061165 A1 | 3/2014 | Stempfer et al. | |
| 2014/0251481 A1 | 9/2014 | Kroll et al. | |
| 2014/0268607 A1 * | 9/2014 | Wicker ................ | H05K 1/0284 361/761 |
| 2014/0291886 A1 | 10/2014 | Mark et al. | |
| 2014/0314964 A1 | 10/2014 | Ackelid et al. | |
| 2014/0361460 A1 | 12/2014 | Mark | |
| 2015/0035198 A1 | 2/2015 | Saba | |
| 2015/0035209 A1 | 2/2015 | Shah et al. | |
| 2015/0048553 A1 | 2/2015 | Dietrich et al. | |
| 2015/0080495 A1 | 3/2015 | Heikkila | |
| 2015/0097307 A1 | 4/2015 | Batchelder et al. | |
| 2015/0125334 A1 | 5/2015 | Uetani et al. | |
| 2015/0174822 A1 | 6/2015 | Huang et al. | |
| 2015/0190967 A1 | 7/2015 | Stava et al. | |
| 2015/0197062 A1 | 7/2015 | Shinar et al. | |
| 2015/0202825 A1 | 7/2015 | Cordingley | |
| 2015/0217367 A1 | 8/2015 | Dickey et al. | |
| 2015/0224714 A1 | 8/2015 | Batchelder et al. | |
| 2015/0239179 A1 | 8/2015 | Goto et al. | |
| 2015/0266092 A1 | 9/2015 | Andersson et al. | |
| 2015/0273582 A1 | 10/2015 | Crump et al. | |
| 2015/0290875 A1 * | 10/2015 | Mark ..................... | B29C 70/20 264/138 |
| 2015/0367375 A1 | 12/2015 | Page | |
| 2015/0367576 A1 | 12/2015 | Page | |
| 2016/0023438 A1 | 1/2016 | Johnson et al. | |
| 2016/0082537 A1 | 3/2016 | Takagi et al. | |
| 2016/0229128 A1 * | 8/2016 | Dayagi ................. | C09D 11/30 |
| 2016/0332373 A1 | 11/2016 | Kuhn et al. | |
| 2016/0361763 A1 | 12/2016 | Batchelder et al. | |
| 2017/0021452 A1 | 1/2017 | Tanaka et al. | |
| 2017/0056138 A1 | 3/2017 | Zandinejad et al. | |
| 2017/0056966 A1 | 3/2017 | Myerberg et al. | |
| 2017/0056967 A1 | 3/2017 | Fulop et al. | |
| 2017/0056970 A1 | 3/2017 | Chin et al. | |
| 2017/0129173 A1 | 5/2017 | Hays et al. | |
| 2017/0173692 A1 | 6/2017 | Myerberg et al. | |
| 2017/0173693 A1 | 6/2017 | Myerberg et al. | |
| 2017/0173694 A1 | 6/2017 | Myerberg et al. | |
| 2017/0173695 A1 | 6/2017 | Myerberg et al. | |
| 2017/0173697 A1 | 6/2017 | Myerberg et al. | |
| 2017/0173877 A1 | 6/2017 | Myerberg et al. | |
| 2017/0173878 A1 | 6/2017 | Myerberg et al. | |
| 2017/0173879 A1 | 6/2017 | Myerberg et al. | |
| 2017/0182560 A1 | 6/2017 | Myerberg et al. | |
| 2017/0203357 A1 | 7/2017 | Duoss et al. | |
| 2017/0203359 A1 | 7/2017 | Duoss et al. | |

(56) References Cited

U.S. PATENT DOCUMENTS

| | | |
|---|---|---|
| 2017/0252812 A1 | 9/2017 | Mykulowycz et al. |
| 2017/0252813 A1 | 9/2017 | Myerberg et al. |
| 2017/0252814 A1 | 9/2017 | Myerberg et al. |
| 2017/0252815 A1 | 9/2017 | Fontana et al. |
| 2017/0252816 A1 | 9/2017 | Shim et al. |
| 2017/0252817 A1 | 9/2017 | Mykulowycz et al. |
| 2017/0252819 A1 | 9/2017 | Gibson et al. |
| 2017/0252820 A1 | 9/2017 | Myerberg et al. |
| 2017/0297108 A1 | 10/2017 | Gibson et al. |
| 2017/0297109 A1 | 10/2017 | Gibson et al. |
| 2018/0154437 A1 | 6/2018 | Mark |
| 2018/0304369 A1 | 10/2018 | Myerberg et al. |
| 2018/0304370 A1 | 10/2018 | Myerberg et al. |
| 2018/0311738 A1 | 11/2018 | Myerberg et al. |
| 2018/0318933 A1 | 11/2018 | Myerberg et al. |

FOREIGN PATENT DOCUMENTS

| | | |
|---|---|---|
| WO | WO-2008140638 | 5/2009 |
| WO | WO-2015006697 | 1/2015 |
| WO | WO-2015167896 | 11/2015 |
| WO | WO-2015168463 | 11/2015 |
| WO | WO-2016198291 | 12/2016 |
| WO | WO-2017035228 | 3/2017 |
| WO | WO-2017106787 | 6/2017 |
| WO | WO-2017151837 | 9/2017 |
| WO | WO-2017152142 | 9/2017 |
| WO | WO-2017181054 | 10/2017 |

OTHER PUBLICATIONS

Griffith, Michelle L. et al., "Freeform Fabrication of Ceramics via Stereolithography", J.Am. Ceram. Soc., 79 [10] 2601-608, Mar. 1996, 8 pages.
Park, J.M. et al., "Ductile Ti-Based Bulk Metallic Glasses with High Specific Strength", Metallurgical and Materials Transactions A, vol. 42A, Jun. 2011, pp. 1456-1462.
Kukla, Christian et al., "Effect of Particle Size on the Properties of Highly-Filled Polymers for Fused Filament Fabrication", Jul. 2016, 5 pages.
Rice, Christopher S. et al., "Metal Solid Freeform Fabrication Using Semi-Solid Slurries", Journal of Metals (JOM), Dec. 2000, pp. 31-33.
Shah, Ramille N. et al., "3D-Printing of Energy Devices Using Particle-Based Inks", Northwestern University, Querrey Institute for BioNanotechnology Institute for Sustainability and Energy at Northwestern Aug. 2014, 5 Pages.
Lobovsky, Maxim et al., "Solid Freeform Fabrication of Stainless Steel Using Fab@Home", Proceedings of the 19th Annual Solid Freeform Fabrication Symposium, Aug. 1, 2008, 6 Pages.
Park, Mansoo et al., "Accelerated sintering in phase-separating nanostructured alloys", Nature Communications; DOI: 10.1038/ncomms7858, Apr. 22, 2015, 6 pages.
Houben, Rene, "Equipment for Printing of High Voscosity Liquids and Molten Metals", Sep. 27, 2012, 20 pages.
Markidou, Anna et al., "Soft-materials elastic and shear moduli measurement using piezoelectric cantilevers", Review of Scientific Instruments, vol. 76, 064302. May 23, 2005, 7 pages.
Chemical Book, "Acrylic anhydride", http://www.chemicalbook.com/chemicalproductproperty_en_cb4325738.htm 2016, 2 Pages.
Riecker, S. et al., "Fused Deposition Modeling—Opportunities for Cheap Metal AM", World PM2016-AM-Deposition Technologies, 2016, 6 Pages.
Burkhardt, Carlo et al., "Fused Filament Fabrication (FFF) of 316L Green Parts for the MIM process", World PM2016-AM-Deposition Technologies, 2016, 7 Pages.
Kukla, Christian et al., "Properties for PIM Feedstocks Used in Fused Filament Fabrication", World PM2016-AM-Deposition Technologies, 2016, 5 Pages.

Han, Yiwei et al., "Droplet formation and Settlement of phase-change ink in high resolution electrodynamic (EHD) 3D printing", Journal of Manufacturing Process. vol. 20, 2015, pp. 485-491.
Jakus, Adam E. et al., "Metallic Architectures from 3D-Printed Powder-Based Liquid Inks", Adv. Funct. Mater, DOI: 10.1002/adfm.201503921, 2015, pp. 6985-6995.
Hartkop, David, "MiniMetalMaker—3D print with metal clay", https://www.indiegogo.com/projects/minimetalmaker-3d-print-with-metal-clay#/ 2015, 3 pages.
Deckers, J. et al., "Additive Manufacturing of Ceramics: A Review", Journal of Ceramic Science and Technology; vol. 5, No. 4, 2014, pp. 245-260.
Guo, S.F. et al., "Fe-Based Bulk Metallic Glasses: Brittle or Ductile?", Applied Physics Letters 105, 161901, 2014, 7 pages.
Chang, et al., "Advances in Powder Metallurgy", Woodhead Publishing, 2013, 3 pages.
Suryanarayana, C. et al., "Iron-based bulk metallic glasses", International Materials Reviews 2013 vol. 58 No. 3, NPL-7 2013, pp. 131-166.
Krassenstein, Brian, "Mini Metal Maker, Affordable Metal Clay 3D Printer, Relaunches on Indiegogo to Fund Mass Production", https://3dprint.com/48292/mini-metal-maker-3d-print/, 2013, 6 Pages.
Agrawal, Dinesh, "Microwave Sintering of Ceramics, Composites, Metals, and Transparent Materials", Journal of Materials Education vol. 19(4.5 & 6), 1997, 9 Pages.
Taylor, Shannon L. et al., "Iron and Nickel Cellular Structures by Sintering of 3D-Printed Oxide or Metallic Particle Inks", Advanced Engineering Materials, DOI: 10.1002/adem.201600365, Sep. 16, 2016, 8 pages.
Wikipedia, "Brazing", Retrieved on Apr. 26, 2017 from <https://en.wikipedia.org/wiki/Brazing> Nov. 9, 2015, pp. 1-27.
Wikipedia, "Shear modulus", Retrieved on Apr. 26, 2017 from <https://en.wikipedia.org/wiki/Shear_modulus> Nov. 26, 2015, pp. 1-5.
Wikipedia, "Eutectic system", Retrieve on Apr. 26, 2017 from <https://en.wikipedia.org/wiki/Eutectic_system> Oct. 29, 2015, pp. 1-6.
Zhang, B. et al., "Amorphous Metallic Plastic", PRL 94, 205502 (2005) May 27, 2005, 4 Pages.
USPTO, "U.S. Appl. No. 15/382,554 Non-Final Office Action dated Sep. 21, 2018", 16 pages.
USPTO, "U.S. Appl. No. 16/024,143 Non-Final Office Action dated Sep. 21, 2018", 14 pages.
USPTO, "U.S. Appl. No. 15/469,371, Non-Final Office Action dated Jun. 7, 2017", 14 pages.
USPTO, "U.S. Appl. No. 15/469,391, Non-Final Office Action dated Jun. 21, 2017", , 8 pages.
USPTO, "U.S. Appl. No. 15/469,403, Non-Final Office Action dated May 25, 2017", 13 pages.
Lefky, Christopher S. et al., "Dissolvable Metal Supports for Printed Metal Parts", Solid Freeform Fabrication 2016: Proceedings of the 26th Annual International; Solid Freeform Fabrication Symposium—An Additive Manufacturing Conference Reviewed Paper, 7 Pages.
ISA, "PCT Application No. PCT/US16/48390 International Search Report and Written Opinion dated Dec. 28, 2016", 13 pages.
WIPO, "PCT Application No. PCT/US16/67378 International Preliminary Report on Patentability dated Jun. 28, 2018", 8 pages.
ISA, "PCT Application No. PCT/US16/67378 International Search Report and Written Opinion dated Jul. 3, 2017", 11 pages.
WIPO, "PCT Application No. PCT/US17/20316 International Preliminary Report on Patentability dated Sep. 13, 2018", 9 pages.
ISA, "PCT Application No. PCT/US17/20316 International Search Report and Written Opinion dated May 25, 2017", 11 pages.
WIPO, "PCT Application No. PCT/US17/20817 International Preliminary Report on Patentability dated Sep. 13, 2018", 25 pages.
ISA, "PCT Application No. PCT/US17/20817 International Search Report and Written Opinion dated Jul. 18, 2017", NPL-96, 29 pages.
ISA, "PCT Application No. PCT/US17/27690 International Search Report and Written Opinion dated Sep. 13, 2017", 14 pages.
Wikipedia, "Viscosity", Retrieved on Apr. 26, 2017 from <https://en.wikipedia.org/wikiNiscosity> pp. 1-19.

(56) References Cited

OTHER PUBLICATIONS

USPTO, "U.S. Appl. No. 16/023,799 Non-Final Office Action dated Nov. 23, 2018", 16 pages.
USPTO, "U.S. Appl. No. 16/023,902 Non-Final Office Action dated Nov. 20, 2018", 14 pages.

* cited by examiner

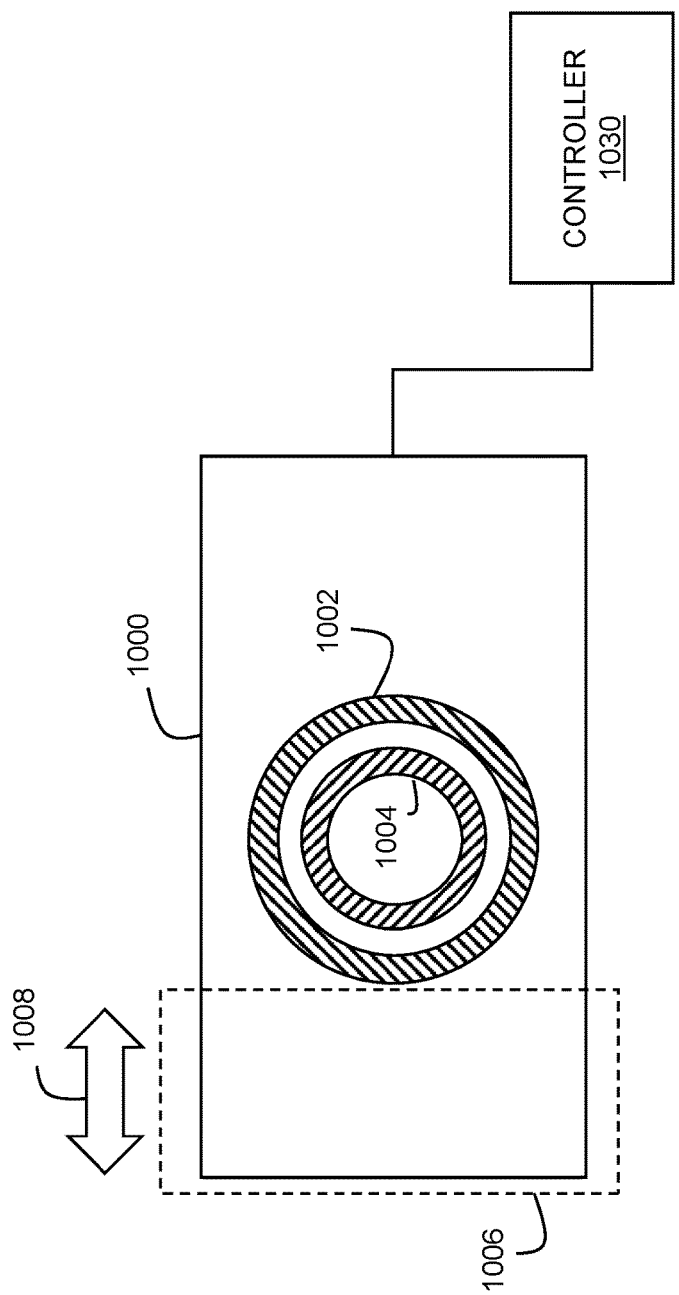

FUSED FILAMENT FABRICATION

CROSS-REFERENCE TO RELATED APPLICATIONS

This application is a continuation of U.S. patent application Ser. No. 15/382,565, filed Dec. 16, 2016, which claims the benefit under 35 U.S.C. § 119(e) of U.S. Prov. App. No. 62/268,458 filed on Dec. 16, 2015, U.S. Prov. App. No. 62/303,310 filed on Mar. 3, 2016, and U.S. Prov. App. No. 62/322,760 filed on Apr. 14, 2016. Each the foregoing applications is hereby incorporated by reference in its entirety.

This application is related to commonly-owned U.S. patent application Ser. No. 15/059,256 filed on Mar. 2, 2016. This application is also related to the following commonly-owned U.S. Patent applications filed on Dec. 16, 2016: U.S. patent application Ser. No. 15/382,535 entitled "Metal printer with vibrating ultrasound nozzle"; U.S. patent application Ser. No. 15/382,543 entitled "Joule Heating for Improved Interlayer Bonding in Fused Filament Fabrication of Metallic Objects"; U.S. patent application Ser. No. 15/382,552 entitled "Bulk Metallic Glass Printer with Shearing Engine in Feed Path"; U.S. patent application Ser. No. 15/382,554 entitled "Layer-Forming Nozzle Exit for Fused Filament Fabrication Process"; U.S. patent application Ser. No. 15/382,558 entitled "Removable Support Structure with an Interface Formed Between Thermally Mismatched Bulk Metallic Glasses"; U.S. patent application Ser. No. 15/382,561 entitled "Additive Manufacturing with Temporal and Spatial Tracking of Thermal Information"; U.S. patent application Ser. No. 15/382,569 entitled "Fused Filament Fabrication Extrusion Nozzle with Concentric Rings"; and U.S. patent application Ser. No. 15/382,574 entitled "Removable Support Structure with an Interface Formed by Crystallization of Bulk Metallic Glass." Each the foregoing applications is hereby incorporated by reference in its entirety.

TECHNICAL FIELD

The present disclosure generally relates to additive manufacturing, and more specifically to the three-dimensional printing of metal objects.

BACKGROUND

Fused filament fabrication provides a technique for fabricating three-dimensional objects from a thermoplastic or similar materials. Machines using this technique can fabricate three-dimensional objects additively by depositing lines of material in layers to additively build up a physical object from a computer model. While these polymer-based techniques have been changed and improved over the years, the physical principles applicable to polymer-based systems may not be applicable to metal-based systems, which tend to pose different challenges. There remains a need for three-dimensional printing techniques suitable for metal additive manufacturing.

SUMMARY

A printer fabricates an object from a computerized model using a fused filament fabrication process and a metallic build material. An ultrasonic vibrator is incorporated into the printer to improve the printing process, e.g., by disrupting a passivation layer on the deposited material to improve interlayer bonding, and to prevent adhesion of the metallic build material to a nozzle and other printer components.

In an aspect, a printer for three-dimensional fabrication of metallic objects may include a reservoir to receive a metallic build material from a source, the metallic build material having a working temperature range between a solid and a liquid state where the metallic build material exhibits plastic properties suitable for extrusion, a heating system operable to heat the metallic build material within the reservoir to a temperature within the working temperature range, a nozzle including an opening that provides a path for the metallic build material, a drive system operable to mechanically engage the metallic build material in solid form below the working temperature range and advance the metallic build material from the source into the reservoir with sufficient force to extrude the metallic build material, while at a temperature within the working temperature range, through the opening in the nozzle, and an ultrasonic vibrator coupled to the nozzle and positioned to convey ultrasonic energy to the metallic build material where the metallic build material extrudes through the opening in the nozzle.

Implementations may include one or more of the following features. The printer may further include a controller that operates the ultrasonic vibrator with sufficient energy to ultrasonically bond an extrudate of the metallic build material exiting the extruder to an object formed of one or more previously deposited layers of the metallic build material on a build plate. The printer may further include a controller that operates the ultrasonic vibrator with sufficient energy to interrupt a passivation layer on a receiving surface of a previously deposited layer of the metallic build material. The printer may further include a controller that operates the ultrasonic vibrator with sufficient energy to augment thermal energy provided by the heating system to maintain the metallic build material at the temperature within the working temperature range within the reservoir. The printer may further include a controller that operates the ultrasonic vibrator with sufficient energy to reduce adhesion of the metallic build material to the nozzle and an interior of the reservoir. The printer may further include a sensor for monitoring a suitability of a receiving surface of a previously deposited layer of the metallic build material for additional build material, and a controller configured to dynamically control operation of the ultrasonic vibrator in response to a signal from the sensor. The printer may further include a sensor for measuring a force applied to the metallic build material by the drive system, and a controller for increasing ultrasonic energy applied by the ultrasonic vibrator to the reservoir in response to a signal from the sensor indicative of an increase in the force applied by the drive system. The metallic build material may include a bulk metallic glass, where the printer further includes a controller coupled to the ultrasonic vibrator, the controller configured to operate the ultrasonic vibrator with sufficient energy to liquefy the bulk metallic glass at a layer between an object fabricated with the bulk metallic glass from the nozzle and a support structure for the object fabricated with the bulk metallic glass. The printer may further include a mechanical decoupler interposed between the ultrasonic vibrator and one or more other components of the printer to decouple ultrasound energy from the ultrasonic vibrator from the one or more other components. The printer may further include a sensor for measuring a quality of a bond between adjacent layers of the metallic build material based on electrical resistance between the adjacent layers, and a controller configured to increase an application of ultrasound energy in response to a signal from the sensor indicating that the quality of the bond is poor. The metallic build material may include a bulk metallic glass. The working temperature range may include a range of temperatures above a glass transition temperature for the bulk metallic glass and below a melting temperature for the bulk metallic glass. The metallic build material may include a non-eutectic composition of eutectic systems that are not at a eutectic composition. The working temperature range may include a range of temperatures above a eutectic temperature for the non-eutectic composition and below a melting point for each component species of the non-eutectic composition. The metallic build material may include a metallic base that melts at a first temperature and a high-temperature inert second phase in particle form that remains inert up to at least a second temperature greater than the first temperature. The working temperature range may include a range of temperatures above a melting point for the metallic base. The printer may include a fused filament fabrication additive manufacturing system. The printer may further include a build plate and a robotic system, the robotic system configured to move the nozzle in a three-dimensional path relative to the build plate in order to fabricate an object from the metallic build material on the build plate according to a computerized model of the object. The printer may further include a controller configured by computer executable code to control the heating system, the drive system, and the robotic system to fabricate the object on the build plate from the metallic build material. The printer may further include a build chamber housing at least the build plate and the nozzle, the build chamber maintaining a build environment suitable for fabricating an object on the build plate from the metallic build material. The printer may further include a vacuum pump coupled to the build chamber for creating a vacuum within the build environment. The printer may further include a heater for maintaining an elevated temperature within the build environment. The printer may further include an oxygen getter for extracting oxygen from the build environment. The build environment may be substantially filled with one or more inert gases. The one or more inert gases may include argon. The heating system may include an induction heating system. The printer may further include a cooling system configured to apply a cooling fluid to the metallic build material as the metallic build material exits the nozzle.

In an aspect, a method for controlling a printer in a three-dimensional fabrication of a metallic object may include extruding a metallic build material through a nozzle of the printer, moving the nozzle relative to a build plate of the printer to fabricate an object on the build plate in a fused filament fabrication process based on a computerized model of the object, and applying ultrasonic energy through the nozzle to an interface between the metallic build material exiting the nozzle and the metallic build material in a previously deposited layer of the object. The method may further include sensing an electrical resistance at the interface and controlling a magnitude of ultrasonic energy based on a bond strength inferred from the electrical resistance.

In another aspect, a computer program product for controlling a printer in a three-dimensional fabrication of a metallic object may include computer executable code embodied in a non-transitory computer readable medium that, when executing on one or more computing devices, performs the steps of extruding a metallic build material through a nozzle of the printer, moving the nozzle relative to a build plate of the printer to fabricate an object on the build plate in a fused filament fabrication process based on a computerized model of the object, and applying ultrasound energy through the nozzle to an interface between the metallic build material exiting the nozzle and the metallic build material in a previously deposited layer of the object.

In yet another aspect, a printer fabricates an object from a computerized model using a fused filament fabrication process and a metallic build material. Joule heating is applied to an interface between adjacent layers of the object by creating an electrical circuit across the interface and applying pulsed current sufficient to join the metallic build material across the adjacent layers.

In an aspect, a printer for three-dimensional fabrication of metallic objects may include a reservoir to receive a metallic build material from a source, a heating system operable to heat the metallic build material within the reservoir to a temperature within a working temperature range where the metallic build material exhibits plastic properties suitable for extrusion, a nozzle including an opening that provides a path for the metallic build material to exit the nozzle in an extrusion, a drive system operable to mechanically engage the metallic build material in solid form below the working temperature range and advance the metallic build material from the source into the reservoir with sufficient force to extrude the metallic build material, while at a temperature within the working temperature range, through the opening in the nozzle, a build plate to receive the build material in a number of layers as it exits the nozzle, and a resistance heating system including an electrical power source, a first lead coupled in electrical communication with the metallic build material in a first layer of the number of layers proximal to the nozzle and a second lead coupled in electrical communication with a second layer of the number of layers proximal to the build plate, thereby forming an electrical circuit for delivery of electrical power from the electrical power source through an interface between the first layer and the second layer to resistively heat the metallic build material across the interface.

Implementations may include one or more of the following features. The second lead may be coupled to the build plate. The first lead may be coupled to a movable probe controllably positioned on a surface of an object fabricated with the metallic build material that has exited the nozzle. The first lead may include a brush lead contacting a surface of the metallic build material at a predetermined location adjacent to an exit of the nozzle. The first lead may couple to the metallic build material on an interior surface of the reservoir. The first lead may couple to the metallic build material at the opening of the nozzle. The printer may further include a sensor system configured to estimate an interface temperature of the metallic build material at the interface between the first layer and the second layer, and a controller configured to adjust a current supplied by the electrical power source in response to the interface temperature. The metallic build material may include a bulk metallic glass. The bulk metallic glass may be fabricated with a glass former selected from the group including of boron, silicon, and phosphorous combined with a magnetic metal selected from the group including of iron, cobalt and nickel to provide an amorphous alloy with increased electrical resistance to facilitate ohmic heating. The working temperature range may include a range of temperatures above a glass transition temperature for the bulk metallic glass and below a melting temperature for the bulk metallic glass. The metallic build material may include a non-eutectic composition of eutectic systems that are not at a eutectic composition. The working temperature range may include a range of temperatures above a eutectic temperature for the non-eutectic composition and below a melting point for each component species of the non-eutectic composition. The metallic build material may include a metallic base that melts at a first temperature and a high-temperature inert second phase in particle form that remains inert up to at least a second temperature greater than the first temperature. The working temperature range may include a range of temperatures above a melting point for the metallic base. The printer may include a fused filament fabrication additive manufacturing system. The printer may further include a build plate and a robotic system, the robotic system configured to move the nozzle in a three-dimensional path relative to the build plate in order to fabricate an object from the metallic build material on the build plate according to a computerized model of the object. The printer may further include a controller configured by computer executable code to control the heating system, the drive system, and the robotic system to fabricate the object on the build plate from the metallic build material. The printer may further include a build chamber housing at least the build plate and the nozzle, the build chamber maintaining a build environment suitable for fabricating an object on the build plate from the metallic build material. The printer may further include a vacuum pump coupled to the build chamber for creating a vacuum within the build environment. The printer may further include a heater for maintaining an elevated temperature within the build environment. The printer may further include an oxygen getter for extracting oxygen from the build environment. The build environment may be substantially filled with one or more inert gases. The one or more inert gases may include argon. The heating system may include an induction heating system. The printer may further include a cooling system configured to apply a cooling fluid to the metallic build material as the metallic build material exits the nozzle.

In an aspect, a method for controlling a printer in a three-dimensional fabrication of a metallic object may include depositing a first layer of a metallic build material through a nozzle of the printer, depositing a second layer of a metallic build material through the nozzle onto the first layer to create an interface between the first layer and the second layer, and applying pulses of electrical current through the interface between the first layer and the second layer to disrupt a passivation layer on an exposed surface of the first layer and improve a mechanical bond across the interface. The method may further include moving the nozzle relative to a build plate of the printer to fabricate an object on the build plate in a fused filament fabrication process based on a computerized model of the object. The method may further include measuring a resistance at the interface and controlling the pulses of electrical current based on a bond strength inferred from the resistance In another aspect, a computer program product for controlling a printer in a three-dimensional fabrication of a metallic object may include computer executable code embodied in a non-transitory computer readable medium that, when executing on one or more computing devices, performs the steps of depositing a first layer of a metallic build material through a nozzle of the printer, depositing a second layer of a metallic build material through the nozzle onto the first layer to create an interface between the first layer and the second layer, and applying pulses of electrical current through the interface between the first layer and the second layer to disrupt a passivation layer on an exposed surface of the first layer and improve a mechanical bond across the interface.

In yet another aspect, a printer fabricates an object from a computerized model using a fused filament fabrication process and a bulk metallic glass. A shearing engine within a feed path for the bulk metallic glass actively induces a shearing displacement of the bulk metallic glass to mitigate crystallization, more specifically to extend processing time for handling the bulk metallic glass at elevated temperatures.

In an aspect, a printer for three-dimensional fabrication of metallic objects may include a reservoir to receive a bulk metallic glass from a source, a heating system operable to heat the bulk metallic glass within the reservoir to a temperature above a glass transition temperature for the bulk metallic glass and below a melting temperature for the bulk metallic glass, a nozzle including an opening that provides a path for the bulk metallic glass to exit the reservoir, a drive system operable to mechanically engage the bulk metallic glass in solid form below the glass transition temperature and advance the bulk metallic glass from the source into the reservoir with sufficient force to extrude the bulk metallic glass, while at a temperature above the glass transition temperature, through the opening in the nozzle, and a shearing engine with a mechanical drive configured to actively induce a shearing displacement of a flow of the bulk metallic glass along a feed path through the reservoir to mitigate crystallization of the bulk metallic glass while above the glass transition temperature.

Implementations may include one or more of the following features. The shearing engine may include an arm positioned within the reservoir, the arm configured to move and displace the bulk metallic glass within the reservoir. The arm may include a rotating arm that rotates about an axis aligned to a flow path through the reservoir. The shearing engine may include a plurality of arms. The printer may further include a sensor to detect a viscosity of the bulk metallic glass within the reservoir, and a controller configured to vary a rate of the shearing displacement by the shearing engine according to a signal from the sensor indicative of the viscosity of the bulk metallic glass. The printer may further include a sensor and a controller, the sensor including a force sensor configured to measure a force applied to the bulk metallic glass by the drive system, and the controller configured to vary a rate of the shearing displacement by the shearing engine in response to a signal from the force sensor indicative of the force applied by the drive system. The printer may further include a sensor and a controller, the sensor including a force sensor configured to measure a load on the shearing engine, and the controller configured to vary a rate of the shearing displacement by the shearing engine in response to a signal from the force sensor indicative of the load on the shearing engine. The shearing engine may include one or more ultrasonic transducers positioned to introduce shear within the bulk metallic glass in the reservoir. The shearing engine may include a rotating clamp, the rotating clamp mechanically engaged with the bulk metallic glass as the bulk metallic glass enters the reservoir at a temperature below the glass transition temperature and the rotating clamp configured to rotate the bulk metallic glass to induce shear as the bulk metallic glass enters the reservoir. The printer may include a fused filament fabrication additive manufacturing system. The printer may further include a build plate and a robotic system, the robotic system configured to move the nozzle in a three-dimensional path relative to the build plate in order to fabricate an object from the bulk metallic glass on the build plate according to a computerized model of the object. The printer may further include a controller configured by computer executable code to control the heating system, the drive system, and the robotic system to fabricate the object on the build plate from the bulk metallic glass. The printer may further include a build chamber housing at least the build plate and the nozzle, the build chamber maintaining a build environment suitable for fabricating an object on the build plate from the bulk metallic glass. The printer may further include a heater for maintaining an elevated temperature within the build environment. The heating system may include an induction heating system. The printer may further include a cooling system configured to apply a cooling fluid to the bulk metallic glass as the bulk metallic glass exits the nozzle.

In an aspect, a method for controlling a printer in a three-dimensional fabrication of a metallic object may include heating a bulk metallic glass in a reservoir of the printer to a temperature above a glass transition temperature for the bulk metallic glass, extruding the bulk metallic glass through a nozzle coupled in fluid communication with the reservoir, moving the nozzle relative to a build plate of the printer to fabricate an object on the build plate in a fused filament fabrication process based on a computerized model of the object, and applying a shearing force to the bulk metallic glass within the reservoir to actively induce a shearing displacement of a flow of the bulk metallic glass along a feed path through the reservoir to the nozzle to mitigate crystallization of the bulk metallic glass while above the glass transition temperature. The method may further include measuring a mechanical resistance to the flow of the bulk metallic glass along the feed path and controlling a magnitude of the shearing force according to the mechanical resistance.

In another aspect, a computer program product for controlling a printer in a three-dimensional fabrication of a metallic object may include computer executable code embodied in a non-transitory computer readable medium that, when executing on one or more computing devices, performs the steps of heating a bulk metallic glass in a reservoir of the printer to a temperature above a glass transition temperature for the bulk metallic glass, extruding the bulk metallic glass through a nozzle coupled in fluid communication with the reservoir, moving the nozzle relative to a build plate of the printer to fabricate an object on the build plate in a fused filament fabrication process based on a computerized model of the object, and applying a shearing force to the bulk metallic glass within the reservoir to actively induce a shearing displacement of a flow of the bulk metallic glass along a feed path through the reservoir to the nozzle to mitigate crystallization of the bulk metallic glass while above the glass transition temperature. The code may further perform the step of measuring a mechanical resistance to the flow of the bulk metallic glass along the feed path and controlling a magnitude of the shearing force according to the mechanical resistance.

In yet another aspect, a printer fabricates an object from a computerized model using a fused filament fabrication process. A former extending from a nozzle of the printer supplements a layer fusion process by applying a normal force on new material as it is deposited to form the object. The former may use a variety of techniques such as heat and rolling to improve physical bonding between layers.

In an aspect, a printer for three-dimensional fabrication may include a reservoir to receive a build material from a source, the build material having a working temperature range between a solid and a liquid state where the build material exhibits plastic properties suitable for extrusion, a heating system operable to heat the build material within the reservoir to a temperature within the working temperature range, a nozzle including an opening that provides a path for the build material, a drive system operable to mechanically engage the build material in solid form below the working temperature range and advance the build material from the source into the reservoir with sufficient force to extrude the build material, while at a temperature within the working temperature range, through the opening in the nozzle, and a former at the opening of the nozzle, the former configured to apply a normal force on the build material exiting the nozzle toward a previously deposited layer of the build material.

Implementations may include one or more of the following features. The former may include a forming wall with a ramped surface that inclines downward from the opening of the nozzle toward a surface of the previously deposited layer to create a downward force as the nozzle moves in a plane parallel to the previously deposited surface. The former may include a roller positioned to apply the normal force. The former may include a heated roller positioned to apply the normal force. The former may include a forming wall to shape the build material in a plane normal to a direction of travel of the nozzle as the build material exits the opening and joins the previously deposited layer. The forming wall may include a vertical feature positioned to shape a side of the build material as the build material exits the opening. The printer may further include a non-stick material disposed about the opening of the nozzle, the non-stick material having poor adhesion to the build material. The non-stick material may include at least one of a nitride, an oxide, a ceramic, and a graphite. The non-stick material may include a material with a reduced microscopic surface area. The build material may include a metallic build material, and where the non-stick material includes a material that is poorly wetted by the metallic build material. The build material may include a bulk metallic glass. The working temperature range may include a range of temperatures above a glass transition temperature for the bulk metallic glass and below a melting temperature for the bulk metallic glass. The build material may include a non-eutectic composition of eutectic systems that are not at a eutectic composition. The working temperature range may include a range of temperatures above a eutectic temperature for the non-eutectic composition and below a melting point for each component species of the non-eutectic composition. The build material may include a metallic base that melts at a first temperature and a high-temperature inert second phase in particle form that remains inert up to at least a second temperature greater than the first temperature. The working temperature range may include a range of temperatures above a melting point for the metallic base. The build material may include a polymer. The printer may include a fused filament fabrication additive manufacturing system. The printer may further include a build plate and a robotic system, the robotic system configured to move the nozzle in a three-dimensional path relative to the build plate in order to fabricate an object from the build material on the build plate according to a computerized model of the object. The printer may further include a controller configured by computer executable code to control the heating system, the drive system, and the robotic system to fabricate the object on the build plate from the build material. The printer may further include a build chamber housing at least the build plate and the nozzle, the build chamber maintaining a build environment suitable for fabricating an object on the build plate from the build material. The printer may further include a vacuum pump coupled to the build chamber for creating a vacuum within the build environment. The printer may further include a heater for maintaining an elevated temperature within the build environment. The printer may further include an oxygen getter for extracting oxygen from the build environment. The build environment may be substantially filled with one or more inert gases. The one or more inert gases may include argon. The heating system may include an induction heating system. The printer may further include a cooling system configured to apply a cooling fluid to the build material as the build material exits the nozzle.

In an aspect, a method for controlling a printer in a three-dimensional fabrication of an object may include extruding a build material through a nozzle of the printer, moving the nozzle relative to a build plate of the printer to fabricate an object on the build plate in a fused filament fabrication process based on a computerized model of the object, and applying a normal force on the build material exiting the nozzle toward a previously deposited layer of the build material with a former extending from the nozzle. The method may further include measuring an instantaneous contact force between the former and the build material exiting the nozzle, and controlling a position of the former based on a signal indicative of the instantaneous contact force. The former may include a heated roller.

In another aspect, a computer program product for controlling a printer in a three-dimensional fabrication of an object may include computer executable code embodied in a non-transitory computer readable medium that, when executing on one or more computing devices, performs the steps of extruding a build material through a nozzle of the printer, moving the nozzle relative to a build plate of the printer to fabricate an object on the build plate in a fused filament fabrication process based on a computerized model of the object, and applying a normal force on the build material exiting the nozzle toward a previously deposited layer of the build material with a former extending from the nozzle.

In yet another aspect, a printer fabricates an object from a computerized model using a fused filament fabrication process and a bulk metallic glass build material. By using thermally mismatched bulk metallic glasses for an object and adjacent support structures, the interface layer between these structures can be melted and crystallized to create a more brittle interface that facilitates removal of the support structure from the object after fabrication.

In an aspect, a method for controlling a printer in a three-dimensional fabrication of a metallic object may include fabricating a support structure for an object from a first bulk metallic glass having a first super-cooled liquid region, and fabricating an object on the support structure from a second bulk metallic glass different than the first bulk metallic glass, where the second bulk metallic glass has a glass transition temperature sufficiently high to promote a crystallization of the first bulk metallic glass during fabrication, and where the second bulk metallic glass is deposited onto the support structure at a temperature at or above the glass transition temperature of the second bulk metallic glass to induce crystallization of the support structure at an interface between the support structure and the object.

Implementations may include one or more of the following features. The method may further include removing the support structure from the object by fracturing the support structure at the interface where the first bulk metallic glass is crystallized. The second bulk metallic glass may have a glass transition temperature above a critical crystallization temperature of the first bulk metallic glass. The method may further include heating the second bulk metallic glass to a second temperature above a critical crystallization temperature of the first bulk metallic glass before deposition onto the first bulk metallic glass. Fabricating the support structure may include fabricating a base of the support structure from a first material, and an interface layer of the support structure between the base and the object from the first bulk metallic glass. The crystallization of the first bulk metallic glass may yield a fracture toughness at the interface not exceeding twenty mpa$\sqrt{m}$.

In an aspect, a computer program product for controlling a printer in a three-dimensional fabrication of a metallic object may include computer executable code embodied in a non-transitory computer readable medium that, when executing on the printer, causes the printer to perform the steps of fabricating a support structure for an object from a first bulk metallic glass having a first super-cooled liquid region, and fabricating an object on the support structure from a second bulk metallic glass different than the first bulk metallic glass, where the second bulk metallic glass has a glass transition temperature sufficiently high to promote a crystallization of the first bulk metallic glass during fabrication, and where the second bulk metallic glass is deposited onto the support structure at a temperature at or above the glass transition temperature of the second bulk metallic glass to induce crystallization of the support structure at an interface between the support structure and the object.

Implementations may include one or more of the following features. The computer program product may further include code that causes the printer to perform the step of removing the support structure from the object by fracturing the support structure at the interface where the first bulk metallic glass is crystallized. The second bulk metallic glass may have a glass transition temperature above a critical crystallization temperature of the first bulk metallic glass. The computer program product may further include code that causes the printer to perform the step of heating the second bulk metallic glass to a second temperature above a critical crystallization temperature of the first bulk metallic glass before deposition onto the first bulk metallic glass. Fabricating the support structure may include fabricating a base of the support structure from a first material, and an interface layer of the support structure between the base and the object from the first bulk metallic glass. The crystallization of the first bulk metallic glass may yield a fracture toughness at the interface not exceeding twenty mpa$\sqrt{m}$.

In an aspect, a printer for three-dimensional fabrication of metallic objects may include a first nozzle configured to extrude a first bulk metallic glass having a first super-cooled liquid region, a second nozzle configured to extrude a second bulk metallic glass different from the first bulk metallic glass, the second bulk metallic glass having a glass transition temperature sufficiently high to promote a crystallization of the first bulk metallic glass during when extruded adjacent to the first bulk metallic glass, a robotic system configured to move the first nozzle and the second nozzle in a fused filament fabrication process to fabricate a support structure and an object based on a computerized model, and a controller configured to fabricate the support structure using the first bulk metallic glass from the first nozzle and to fabricate the object on the support structure from the second bulk metallic glass, where the controller is configured to deposit the second bulk metallic glass onto the support structure at a temperature at or above the glass transition temperature of the second bulk metallic glass to induce crystallization of the support structure at an interface between the support structure and the object.

Implementations may include one or more of the following features. The printer may further include a build plate, where the robotic system is configured to move the first nozzle and the second nozzle in a three-dimensional path relative to the build plate in order to fabricate the support structure and the object on the build plate. The printer may further include a build chamber, the build chamber housing at least the build plate, the first nozzle and the second nozzle, and the build chamber maintaining a build environment suitable for fabricating the object and the support structure on the build plate. The printer may further include a heater for maintaining an elevated temperature within the build environment. The heater may include an induction heating system. The heater may include a resistive heating system. The printer may further include a cooling system configured to apply a cooling fluid to the second bulk metallic glass as the second bulk metallic glass exits the second nozzle. The second bulk metallic glass may have a glass transition temperature above a critical crystallization temperature of the first bulk metallic glass.

In an aspect, a printer fabricates an object from a computerized model using a fused filament fabrication process and a metallic build material such as a bulk metallic glass. A thermal history of the object may be maintained, e.g., on a voxel-by-voxel basis in order to maintain a thermal budget throughout the object suitable for preserving the amorphous, uncrystallized state of the bulk metallic glass, and to provide a record for prospective use and analysis of the object.

An aspect may include a method for controlling a printer in a three-dimensional fabrication of a metallic object, the method including storing a model for a rate of crystallization of a bulk metallic glass according to time and temperature, providing a source of the bulk metallic glass in a predetermined state relative to the model, fabricating an object from the bulk metallic glass using an additive manufacturing process, monitoring a temperature of the bulk metallic glass on a voxel-by-voxel basis as the bulk metallic glass is heated and deposited to form the object, estimating a degree of crystallization for a voxel of the bulk metallic glass, and adjusting a thermal parameter of the additive manufacturing process when the degree of crystallization for the voxel of the bulk metallic glass exceeds a predetermined threshold.

Implementations may include one or more of the following features. The additive manufacturing process may include a fused filament fabrication process. Monitoring the temperature may include measuring a surface temperature of the bulk metallic glass. Monitoring the temperature may include estimating a temperature of the bulk metallic glass based on one or more sensed parameters. Monitoring the temperature may include monitoring the temperature of the bulk metallic glass prior to deposition. Monitoring the temperature may include monitoring the temperature of the bulk metallic glass after deposition in the object. Adjusting the thermal parameter may include adjusting at least one of a pre-deposition heating temperature, a build chamber temperature, and a build plate temperature of the additive manufacturing process. Adjusting the thermal parameter may include directing a cooling fluid toward a surface of the object. The method may further include storing a fabrication log including the degree of crystallization for each voxel of the object. The method may further include storing a fabrication log including a thermal history for each voxel of the object.

In an aspect, a computer program product for controlling a printer in a three-dimensional fabrication of a metallic object may include computer executable code embodied in a non-transitory computer readable medium that, when executing on the printer, causes the printer to perform the steps of storing a model for a rate of crystallization of a bulk metallic glass according to time and temperature, providing a source of the bulk metallic glass in a predetermined state relative to the model, fabricating an object from the bulk metallic glass using an additive manufacturing process, monitoring a temperature of the bulk metallic glass on a voxel-by-voxel basis as the bulk metallic glass is heated and deposited to form the object, estimating a degree of crystallization for a voxel of the bulk metallic glass, and adjusting a thermal parameter of the additive manufacturing process when the degree of crystallization for the voxel of the bulk metallic glass exceeds a predetermined threshold.

Implementations may include one or more of the following features. The additive manufacturing process may include a fused filament fabrication process. Monitoring the temperature may include measuring a surface temperature of the bulk metallic glass. Monitoring the temperature may include estimating a temperature of the bulk metallic glass based on one or more sensed parameters. Monitoring the temperature may include monitoring the temperature of the bulk metallic glass prior to deposition. Monitoring the temperature may include monitoring the temperature of the bulk metallic glass after deposition in the object. Adjusting the thermal parameter may include adjusting at least one of a pre-deposition heating temperature, a build chamber temperature, and a build plate temperature of the additive manufacturing process. Adjusting the thermal parameter may include directing a cooling fluid toward a surface of the object. The computer program product may further include storing a fabrication log including the degree of crystallization for each voxel of the object. The computer program product may further include storing a fabrication log including a thermal history for each voxel of the object.

In an aspect, a printer for three-dimensional fabrication of metallic objects may include a fused filament fabrication system configured to additively fabricate an object from a bulk metallic glass, a sensor system configured to volumetrically monitor a temperature of the bulk metallic glass, a memory storing a spatial temporal map of thermal history for the bulk metallic glass, and a controller configured to adjust a thermal parameter of the fused filament fabrication system during fabrication according to the spatial temporal map of thermal history.

In yet another aspect, a printer fabricates an object from a computerized model using a fused filament fabrication process. The shape of an extrusion nozzle may be varied during extrusion to control, e.g., an amount of build material deposited, a shape of extrudate exiting the nozzle, a feature resolution, and the like.

In an aspect, a printer for three-dimensional fabrication may include a reservoir to receive a build material from a source, the build material having a working temperature range where the build material exhibits plastic behavior suitable for extrusion, a heating system operable to heat the build material within the reservoir to a temperature within the working temperature range, a nozzle including a variable opening that provides a path for the build material to exit the reservoir, the variable opening formed between a plate and die, where the plate includes an opening and where the die is configured to slide relative to the plate to adjust a portion of the opening exposed for extrusion, and a drive system operable to mechanically engage the build material at a temperature below the working temperature range and advance the build material from the source into the reservoir with sufficient force to extrude the build material, while at a temperature within the working temperature range, through the opening in the nozzle.

Implementations may include one or more of the following features. The printer may further include a controller configured to fully close the variable opening to terminate an extrusion of the build material. The printer may further include a controller configured to adjust a size of the variable opening according to a target feature size for an object fabricated by the printer from the build material. The printer may further include a controller configured to adjust a size of the variable opening to increase an extrusion cross section during fabrication of one or more interior structures for an object and to decrease the extrusion cross section during fabrication of one or more exterior structures for the object. The printer may further include a controller configured to adjust a size of the variable opening to increase an extrusion cross section during fabrication of a support structure for an object and to decrease the extrusion cross section during fabrication of one or more exterior structures for the object. The opening in the plate may include a wedge. The printer may further include a rotating mount rotationally coupling the nozzle to the printer and a rotating drive to control a rotational orientation of the nozzle during extrusion. The build material may include a thermoplastic. The build material may include a binder system loaded with a powdered metal build material. The build material may include a bulk metallic glass. The working temperature range may include a range of temperatures above a glass transition temperature for the bulk metallic glass and below a melting temperature for the bulk metallic glass. The build material may include a non-eutectic composition of eutectic systems that are not at a eutectic composition. The working temperature range may include a range of temperatures above a eutectic temperature for the non-eutectic composition and below a melting point for each component species of the non-eutectic composition. The build material may include a metallic base that melts at a first temperature and a high-temperature inert second phase in particle form that remains inert up to at least a second temperature greater than the first temperature. The working temperature range may include a range of temperatures above a melting point for the metallic base. The printer may include a fused filament fabrication additive manufacturing system. The printer may further include a build plate and a robotic system, the robotic system configured to move the nozzle in a three-dimensional path relative to the build plate in order to fabricate an object from the build material on the build plate according to a computerized model of the object. The printer may further include a controller configured by computer executable code to control the heating system, the drive system, and the robotic system to fabricate the object on the build plate from the build material. The printer may further include a build chamber housing at least the build plate and the nozzle, the build chamber maintaining a build environment suitable for fabricating an object on the build plate from the build material. The printer may further include a vacuum pump coupled to the build chamber for creating a vacuum within the build environment. The printer may further include a heater for maintaining an elevated temperature within the build environment. The printer may further include an oxygen getter for extracting oxygen from the build environment. The build environment may be substantially filled with one or more inert gases. The one or more inert gases may include argon. The printer may further include a cooling system configured to apply a cooling fluid to the build material as the build material exits the nozzle.

In an aspect, a method for controlling a printer in a three-dimensional fabrication of an object may include extruding one or more build materials through a nozzle of the printer, an exit to the nozzle having a variable opening, moving the nozzle relative to a build plate of the printer to fabricate an object on the build plate in a fused filament fabrication process based on a computerized model of the object, and varying a cross-sectional shape of an exit to the nozzle while extruding to provide a variably shaped extrudate during fabrication of the object. Varying the cross-sectional shape may include moving a plate relative to a fixed opening of a die to adjust a portion of the fixed opening that is exposed for extrusion. Varying the cross-sectional shape may include varying at least one of a shape, a size and a rotational orientation of the cross-sectional shape.

In another aspect, a computer program product for controlling a printer in a three-dimensional fabrication of an object may include computer executable code embodied in a non-transitory computer readable medium that, when executing on one or more computing devices, performs the steps of extruding one or more build materials through a nozzle of the printer, an exit to the nozzle having a variable opening, moving the nozzle relative to a build plate of the printer to fabricate an object on the build plate in a fused filament fabrication process based on a computerized model of the object, and varying a cross-sectional shape of an exit to the nozzle while extruding to provide a variably shaped extrudate during fabrication of the object.

In yet another aspect, a printer fabricates an object from a computerized model using a fused filament fabrication process. The exit of the nozzle may include a number of concentric rings, where each of which may be selectively opened or closed during extrusion to control extrusion properties such as a volume of extrudate or a mixture of material exiting the nozzle.

In an aspect, a printer for three-dimensional fabrication may include a nozzle including a number of openings formed by a number of concentric rings providing paths for a build material to extrude from the nozzle in a fabrication process for an object, a build plate, a robotic system configured to move the nozzle during extrusion to fabricate the object on the build plate, and a controller configured to selectively extrude the build material from the number of concentric rings.

Implementations may include one or more of the following features. The printer may further include one or more dies to control exposure of the number of concentric rings for extrusion. The printer may further include a number of sources of build material, one for each of the number of concentric rings, where each one of the number of sources of build material independently supplies the build material to a corresponding one of the number of concentric rings. The printer may further include a reservoir to receive a build material from a source, the reservoir coupled in fluid communication with the number of concentric rings of the nozzle, a heating system operable to heat the build material within the reservoir to a temperature above a glass transition temperature for the build material, and a drive system operable to mechanically engage the build material at a temperature below the glass transition temperature and advance the build material from the source into the reservoir with sufficient force to extrude the build material, while at a temperature above the glass transition temperature, through the number of concentric rings. The controller may be configured to adjust a size of extrusion from the nozzle by selectively extruding through one or more of the number of concentric rings. The controller may be configured to selectively extrude through one or more of the number of concentric rings to increase an extrusion cross section during fabrication of one or more interior structures for the object and to decrease the extrusion cross section during fabrication of one or more exterior structures for the object. The controller may be configured to selectively extrude through one or more of the number of concentric rings to increase an extrusion cross section during fabrication of a support structure for the object and to decrease the extrusion cross section during fabrication of one or more exterior structures for the object. The build material may include a thermoplastic. The build material may include a powdered metallic build material in a binder system. The build material may include a bulk metallic glass having a working temperature range. The working temperature range may include a range of temperatures above a glass transition temperature for the bulk metallic glass and below a melting temperature for the bulk metallic glass. The build material may include a non-eutectic composition of eutectic systems that are not at a eutectic composition. The build material may have a working temperature range suitable for extrusion, where the working temperature range includes a range of temperatures above a eutectic temperature for the non-eutectic composition and below a melting point for each component species of the non-eutectic composition. The build material may include a metallic base that melts at a first temperature and a high-temperature inert second phase in particle form that remains inert up to at least a second temperature greater than the first temperature. The build material may have a working temperature range suitable for extrusion, where the working temperature range includes a range of temperatures above a melting point for the metallic base. The printer may further include a build plate and a robotic system, the robotic system configured to move the nozzle in a three-dimensional path relative to the build plate in order to fabricate an object from the build material on the build plate according to a computerized model of the object. The printer may further include a build chamber housing at least the build plate and the nozzle, the build chamber maintaining a build environment suitable for fabricating an object on the build plate from the build material. The printer may further include a vacuum pump coupled to the build chamber for creating a vacuum within the build environment. The printer may further include a heater for maintaining an elevated temperature within the build environment. The printer may further include an oxygen getter for extracting oxygen from the build environment. The build environment may be substantially filled with one or more inert gases. The printer may further include a cooling system configured to apply a cooling fluid to the build material as the build material exits the nozzle. Two of the number of openings may be at different z-axis heights relative to the build plate.

In an aspect, a method for controlling a printer in a three-dimensional fabrication of an object may include extruding one or more build materials through a nozzle of the printer, where an exit to the nozzle has a cross-sectional shape with a number of concentric rings, moving the nozzle relative to a build plate of the printer to fabricate an object on the build plate in a fused filament fabrication process based on a computerized model of the object, and selectively opening or closing each of the number of concentric rings while extruding to control an extrusion of one of the one or more build materials. Selectively opening or closing each of the number of concentric rings may include opening or closing each of the number of concentric rings according to a location of the extrusion within the object. Selectively opening or closing each of the number of concentric rings may include opening or closing each of the number of concentric rings according to a target volume flow rate of the extrusion.

In another aspect, a computer program product for controlling a printer in a three-dimensional fabrication of an object may include computer executable code embodied in a non-transitory computer readable medium that, when executing on one or more computing devices, performs the steps of extruding one or more build materials through a nozzle of the printer, where an exit to the nozzle has a cross-sectional shape with a number of concentric rings, moving the nozzle relative to a build plate of the printer to fabricate an object on the build plate in a fused filament fabrication process based on a computerized model of the object, and selectively opening or closing each of the number of concentric rings while extruding to control an extrusion of one of the one or more build materials.

In yet another aspect, a printer fabricates an object from a computerized model using a fused filament fabrication process and a bulk metallic glass build material. By heating the bulk metallic glass at an elevated temperature in between an object and adjacent support structures, an interface layer can be interposed between the object and support where the bulk metallic glass becomes crystallized to create a more brittle interface that facilitates removal of the support structure from the object after fabrication.

In an aspect, a method for fabricating an interface between a support structure and an object using a bulk metallic glass may include fabricating a layer of a support structure for an object from a bulk metallic glass having a super-cooled liquid region at a first temperature above a glass transition temperature for the bulk metallic glass, fabricating an interface layer of the bulk metallic glass on the layer of the support structure at a second temperature sufficiently high to promote crystallization of the bulk metallic glass during fabrication, and fabricating a layer of the object on the interface layer at a third temperature below the second temperature and above the glass transition temperature and below the second temperature.

Implementations may include one or more of the following features. The method may further include removing the support structure from the object by fracturing the support structure at the interface layer between the support structure and the object where the bulk metallic glass is crystallized. The method may further include heating the object and the support structure after fabrication to substantially fully crystallize the interface layer. Fabricating the layer of the support structure may include fabricating the layer of the support structure with a fused filament fabrication process. Fabricating the layer of the object may include fabricating the layer of the object with a fused filament fabrication process. Fabricating the layer of the object may include fabricating the layer of the object with a laser sintering fabrication process and a powdered bulk metallic glass build material. The crystallization of the bulk metallic glass may yield a fracture toughness at the interface not exceeding twenty mpa√m.

In an aspect, a computer program product for controlling a printer in a three-dimensional fabrication of a metallic object may include computer executable code embodied in a non-transitory computer readable medium that, when executing on the printer, causes the printer to perform the steps of fabricating a layer of a support structure for an object from a bulk metallic glass having a super-cooled liquid region at a first temperature above a glass transition temperature for the bulk metallic glass, fabricating an interface layer of the bulk metallic glass on the layer of the support structure at a second temperature sufficiently high to promote crystallization of the bulk metallic glass during fabrication, and fabricating a layer of the object on the interface layer at a third temperature below the second temperature and above the glass transition temperature and below the second temperature.

Implementations may include one or more of the following features. The computer program product may further include code that causes the printer to perform the step of heating the object and the support structure after fabrication to substantially fully crystallize the interface layer. Fabricating the layer of the support structure may include fabricating the layer of the support structure with a fused filament fabrication process. Fabricating the layer of the object may include fabricating the layer of the object with a fused filament fabrication process. Fabricating the layer of the object may include fabricating the layer of the object with a laser sintering fabrication process and a powdered bulk metallic glass build material. The crystallization of the bulk metallic glass may yield a fracture toughness at the interface not exceeding twenty mpa√m.

In an aspect, a printer for three-dimensional fabrication of metallic objects may include a nozzle configured to extrude a bulk metallic glass having a super-cooled liquid region at a first temperature above a glass transition temperature for the bulk metallic glass, a robotic system configured to move the nozzle in a fused filament fabrication process to fabricate a support structure and an object based on a computerized model, and a controller configured to fabricate an interface layer between the support structure and the object by depositing the bulk metallic glass in the interface layer at a second temperature greater than the first temperature, the second temperature sufficiently high to promote crystallization of the bulk metallic glass during fabrication.

Implementations may include one or more of the following features. The second temperature may be near a melting temperature for the bulk metallic glass. The second temperature may be near a critical crystallization temperature for the bulk metallic glass. The printer may further include a build plate, where the robotic system is configured to move the nozzle in a three-dimensional path relative to the build plate in order to fabricate the support structure and the object on the build plate. The printer may further include a build chamber, the build chamber housing at least the build plate and the nozzle, the build chamber maintaining a build environment suitable for fabricating the object and the support structure on the build plate. The printer may further include a heater for maintaining an elevated temperature within the build environment. The printer may further include a cooling system configured to apply a cooling fluid to the bulk metallic glass as the bulk metallic glass exits the nozzle.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 10 shows a nozzle with concentric rings for extrusion.

DETAILED DESCRIPTION

Figure 1:
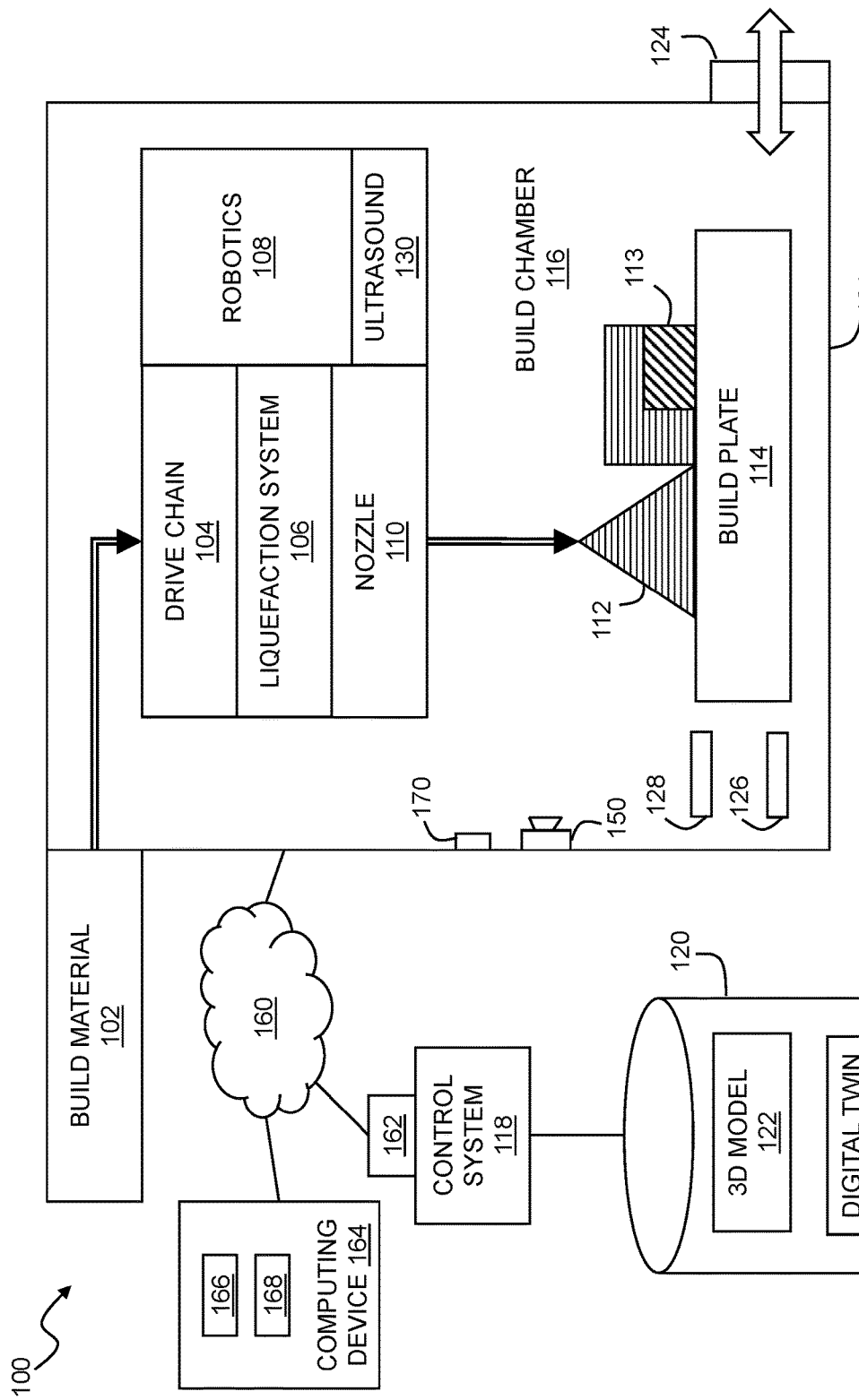
FIG. 1 is a block diagram of an additive manufacturing system.

Embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the claimed embodiments.

In the following description, it is understood that terms such as "first," "second," "top," "bottom," "up," "down," and the like, are words of convenience and are not to be construed as limiting terms unless specifically stated to the contrary.

Described herein are devices, systems, and methods related to three-dimensional printing, where a design, such as a computer-aided drafting (CAD) file, is provided to a computer operably connected to a three-dimensional printer (e.g., a three-dimensional metal printer), and the object represented by the design can be manufactured in a layer-by-layer fashion by the three-dimensional printer.

In general, the following description emphasizes three-dimensional printers using metal as a build material for forming a three-dimensional object. More specifically, the description emphasizes metal three-dimensional printers that deposit metal, metal alloys, or other metallic compositions for forming a three-dimensional object using fused filament fabrication or similar techniques. In these techniques, a bead of material is extruded as "roads" or "paths," in a layered series of two dimensional patterns to form a three-dimensional object from a digital model. However, it will be understood that other additive manufacturing techniques and other build materials may also or instead be used. Thus, although the devices, systems, and methods emphasize metal three-dimensional printing using fused filament fabrication, a skilled artisan will recognize that many of the techniques discussed herein may be adapted to three-dimensional printing using other materials (e.g., thermoplastics or other polymers and the like, or a ceramic powder loaded in an extrudable binder matrix) and other additive fabrication techniques including without limitation multijet printing, electrohydrodynamic jetting, pneumatic jetting, stereolithography, Digital Light Processor (DLP) three-dimensional printing, selective laser sintering, binder jetting and so forth. Such techniques may benefit from the systems and methods described below, and all such printing technologies are intended to fall within the scope of this disclosure, and within the scope of terms such as "printer," "three-dimensional printer," "fabrication system," "additive manufacturing system," and so forth, unless a more specific meaning is explicitly provided or otherwise clear from the context.

A three-dimensional printer as contemplated herein may use a bulk metallic glass (BMG) as a build material. Bulk-solidifying amorphous alloys, or bulk metallic glasses (BMGs) are metallic alloys that have been supercooled into an amorphous, noncrystalline state. In this state, many of these alloys can be reheated above a glass transition temperature to yield a consistency suitable for extrusion while retaining their non-crystalline microstructure. Thus, these materials may provide a useful working temperature range where the material becomes sufficiently pliable to extrude in a fused filament fabrication process while retaining an amorphous structure. Amorphous alloys also have many superior properties to their crystalline counterparts in terms of hardness, strength, and so forth. However, amorphous alloys may also impose special handling requirements. For example, the supercooled state of amorphous alloys may begin to degrade with exposure to prolonged heating, more specifically due to crystallization that results in solidification of the material. This can occur even at temperatures below the melting temperature, and is not generally reversible without re-melting and supercooling the alloy.

A range of BMGs may be employed as a metallic build material in an additive manufacturing process such as fused filament fabrication or "FFF". In general, those BMGs with greater temperature windows between a glass transition temperature (where the material can be extruded) and the melting temperature (where a material melts and crystallizes upon subsequent cooling) are preferred, although not necessary for a properly functioning FFF system. Similarly, the crystallization rate of particular alloys within this temperature window may render some BMGs more suitable than others for prolonged heating and plastic handling. At the same time, high ductility, high strength, a non-brittleness are generally desirable properties, as is the use of relatively inexpensive elemental components. While various BMG systems meet these criteria to varying degrees, these alloys are not necessary for use in a BMG FFF system as contemplated herein. Numerous additional alloys and alloy systems may be usefully employed, such as any of those described in U.S. Provisional Application No. 62/268,458, filed on Dec. 16, 2015, the entire contents of which is hereby incorporated by reference.

Other materials may also or instead provide similarly attractive properties for use as a metallic build material in a metal fabrication process using fused filament fabrication as contemplated herein. For example, U.S. application Ser. No. 15/059,256, filed on Mar. 2, 2016 and incorporated by reference herein in its entirety, describes various multi-phase build materials using a combination of a metallic base and a high temperature inert second phase, any of which may be usefully deployed as a metal build material for fused filament fabrication. Thus, one useful metallic build material contemplated herein includes metallic build material that melts at a first temperature and a high temperature inert second phase in particle form that remains inert up to at least a second temperature greater than the first temperature. In another aspect, compositions of eutectic systems that are not at the eutectic composition, also known as non-eutectic or off-eutectic compositions, may usefully be employed as a metallic build material for fused filament fabrication. These non-eutectic compositions contain components that solidify at different temperatures to provide a plastic melting range. Within this melting range, a non-eutectic composition may exhibit a useful working temperature with a semi-solid phase. In general, a non-eutectic or off-eutectic composition of eutectic systems may be categorized as a hypoeutectic composition or hypereutectic composition according to the relative composition of non-eutectic species in the system, any of which may be usefully maintained in a semi-solid state at certain temperatures for use in a fused filament fabrication system as contemplated herein.

Other materials may contain metallic content mixed with a thermoplastic, wax or other material matrix or the like to obtain a relatively low-temperature metallic build material that can be extruded at low temperatures (e.g., around two-hundred degrees Celsius or other temperature well below typical metal melting temperatures). For example, materials such as metal injection molding materials or other powdered metallurgy compositions contain significant metal content, but are workable for extrusion at low temperatures. These materials, or other materials similarly composed of metal powder and a binder system, may be used to fabricate green parts that can be debound and sintered into fully densified metallic objects, and may be used as metallic build materials as contemplated herein.

More generally, any build material with metallic content that provides a useful working range for heated extrusion may be used as a metallic build material as contemplated herein. The limits of this window will depend on the class of material (e.g., BMG, non-eutectic, etc.) and the metallic and non-metallic constituents, but the suitable metallic build materials will generally exhibit plastic or properties suitable for extrusion within a range of temperatures between a solid and a liquid state of the metallic build material. For bulk metallic glasses, the useful temperature range is typically between the glass transition and the melting temperature. For non-eutectic compositions, the useful temperature range is typically between the eutectic temperature and the overall melting temperature, although other metrics such as the creep relaxation temperature may be usefully employed to quantify the top boundary of the temperature window, above which the viscosity of the composition drops quickly. For multi-phase build materials, the window may begin at any temperature above the melting temperature of the base metallic element(s).

In some of the applications described herein, the conductive properties of the metallic build material are used in the fabrication process, e.g. to provide an electrical path for inductive or resistive heating. For these uses, the term metallic build material should more generally be understood to mean a metal-bearing build material with sufficient conductance to form an electrical circuit therethrough for carrying current. Where a build material is specifically used for carrying current in an additive fabrication application, these materials may also be referred to as conductive metallic build materials.

FIG. 1 is a block diagram of an additive manufacturing system. The additive manufacturing system 100 shown in the figure may, for example, be a metallic printer including a fused filament fabrication additive manufacturing system, or include any other additive manufacturing system configured for three-dimensional printing using a metal build material such as a metallic alloy and/or BMG. However, the additive manufacturing system 100 may also or instead be used with other build materials including plastics, ceramics, and the like, as well as combinations of the foregoing.

In general, the additive manufacturing system may include a three-dimensional printer 101 (or simply 'printer' 101) that deposits a metal, metal alloy, metal composite or the like using fused filament fabrication. In general, the printer 101 may include a build material 102 that is propelled by a drive chain 104 and heated to a plastic state by a liquefaction system 106, and then extruded through one or more nozzles 110. By concurrently controlling robotics 108 to position the nozzle(s) along an extrusion path relative to a build plate 114, an object 112 may be fabricated on the build plate 114 within a build chamber 116. In general, a control system 118 may manage operation of the printer 101 to fabricate the object 112 according to a three-dimensional model using a fused filament fabrication process or the like.

The build material 102 may, for example, include any of the amorphous alloys described herein, or in U.S. Provisional Application No. 62/268,458, filed on Dec. 16, 2015, the entire contents of which is hereby incorporated by reference, or any other bulk metallic glass or other material or combination of materials suitable for use in a fused filament fabrication process as contemplated herein. The build material 102 may be provided in a variety of form factors including, without limitation, any of the form factors described herein or in materials incorporated by reference herein. The build material 102 may be provided, for example, from a hermetically sealed container or the like (e.g., to mitigate passivation), as a continuous feed (e.g., a wire), or as discrete objects such as rods or rectangular prisms that can be fed into a chamber or the like as each prior discrete unit of build material 102 is heated and extruded. In one aspect, the build material 102 may include fibers of carbon, glass, Kevlar, boron silica, graphite, quartz, or any other material that can enhance tensile strength of an extruded line of material. In one aspect, this may be used to increase strength of a printed object. In another aspect, this may be used to extend bridging capabilities by maintaining a structural path between the nozzle and a cooled, rigid portion of an object being fabricated. In one aspect, two build materials 102 may be used concurrently, e.g., through two different nozzles, where one nozzle is used for general fabrication and another nozzle is used for bridging, supports, or similar features.

The build material 102 may include a metal wire, such as a wire with a diameter of approximately 80 μm, 90 μm, 100 μm, 0.5 mm, 1 mm, 1.5 mm, 2 mm, 2.5 mm, 3 mm, or any other suitable diameter. In another aspect, the build material 102 may be a metal powder, which may be loaded into a binder system for heating and extruding using the techniques contemplated herein. This latter technique may, for example, be particularly useful for fabricating green parts that can be subsequently debound and sintered into a final metal part.

The build material 102 may have any shape or size suitable for extrusion in a fused filament fabrication process. For example, the build material 102 may be in pellet or particulate form for heating and compression, or the build material 102 may be formed as a wire (e.g., on a spool), a billet, or the like for feeding into an extrusion process. More generally, any geometry that might be suitably employed for heating and extrusion might be used as a form factor for a build material 102 as contemplated herein. This may include loose bulk shapes such as spherical, ellipsoid, or flaked particles, as well as continuous feed shapes such as rods, wires, filaments or the like. Where particulates are used, the particulate can have any size useful for heating and extrusion. For example, particles may have an average diameter of between about 1 micron and about 100 microns, such as between about 5 microns and about 80 microns, between about 10 microns and about 60 microns, between about 15 microns and about 50 microns, between about 15 microns and about 45 microns, between about 20 microns and about 40 microns, or between about 25 microns and about 35 microns. For example, in one embodiment, the average diameter of the particulate is between about 25 microns and about 44 microns. In some embodiments, smaller particles, such as those in the nanometer range, or larger particle, such as those bigger than 100 microns, can also or instead be used.

As described herein, the build material 102 may include metal. The metal may include aluminum, such as elemental aluminum, an aluminum alloy, or an aluminum composite containing non-metallic materials such as ceramics or oxides. The metal may also or instead include iron. For example, the metal may include a ferrous alloy such as steel, stainless steel, or some other suitable alloy. The metal may also or instead include gold, silver, or alloys of the same. The metal may also or instead include one or more of a superalloy, nickel (e.g., a nickel alloy), titanium (e.g., a titanium alloy), and the like. Other metals are also or instead possible.

The term metal, as used herein, may encompass both homogeneous metal compositions and alloys thereof, as well as additional materials such as modifiers, fillers, colorants, stabilizers, strengtheners and the like. For instance, in some implementations, a non-metallic material (e.g., plastic, glass, carbon fiber, and so forth) may be imbedded as a support material to reinforce structural integrity. A non-metallic additive to an amorphous metal may be selected based on a melting temperature that is matched to a glass transition temperature or other lower viscosity temperature (e.g., a temperature between the glass transition temperature and melting temperature) of the amorphous metal. The presence of a non-metallic support material may be advantageous in many fabrication contexts, such as extended bridging where build material is positioned over large unsupported regions. Moreover, other non-metallic compositions such as sacrificial support materials may be usefully deposited using the systems and methods contemplated herein. Thus, for example, water soluble support structures having high melting temperatures, which are matched to the temperature range (i.e., between the glass transition temperature and melting temperature) of the metal build material can be included within the printed product.

A printer 101 disclosed herein may include a first nozzle for extruding a first material (such as a bulk metallic glass or other build material), and a second nozzle for extruding a second material (such as a thermally compatible BMG with a reinforcing additive. The second material may be reinforced, for example, such that the second material has sufficient tensile strength or rigidity at an extrusion temperature to maintain a structural path between the second nozzle and a solidified portion of an object during an unsupported bridging operation. Other materials may also or instead be used as a second material. For example, this may include thermally matched polymers for fill, support, separation layers, or the like. In another aspect, this may include support materials such as water-soluble support materials with high melting temperatures at or near the window for extruding the first material. Useful dissolvable materials may include a salt or any other water soluble material(s) with suitable thermal and mechanical properties for extrusion as contemplated herein.

In an aspect, the build material 102 may be fed (one by one) as billets or other discrete units into an intermediate chamber for delivery into the build chamber 116 and subsequent heating and deposition. The build material 102 may also or instead be provided in a cartridge or the like with a vacuum environment that can be directly or indirectly coupled to a vacuum environment of the build chamber 116. In another aspect, a continuous feed of the build material 102, e.g., a wire or the like, may be fed through a vacuum gasket into the build chamber 116 in a continuous fashion.

While the following description emphasizes metallic build materials, many of the following methods and systems are also useful in the context of other types of materials. Thus, the term "build material" as used herein should be understood to include other additive fabrication materials, and in particular additive fabrication materials suitable for fused filament fabrication. This may for example include a thermoplastic such as acrylonitrile butadiene styrene (ABS), polylactic acid (PLA), polyether ether ketone (PEEK) or any other suitable polymer or the like. In another aspect, the build material 102 may include a binder system loaded with metallic powder or the like suitable for fused filament fabrication of green parts that can be debound and sintered into a final, metallic object. All such materials are intended to fall within the scope of the term "build material" unless a different meaning is explicitly stated or otherwise clear from the context.

A drive chain 104 may include any suitable gears, compression pistons, or the like for continuous or indexed feeding of the build material 102 into the liquefaction system 106. In one aspect, the drive chain 104 may include a gear such as a spur gear with teeth shaped to mesh with corresponding features in the build material such as ridges, notches, or other positive or negative detents. In another aspect, the drive chain 104 may use heated gears or screw mechanisms to deform and engage with the build material. Thus, in one aspect a printer for a metal FFF process may heat a metal (e.g., a BMG) to a temperature between a glass transition temperature and a melting temperature for extrusion, and heat a gear that engages with, deforms, and drives the metal in a feed path toward the nozzle 110. In another aspect, the drive chain 104 may include multiple stages. In a first stage, the drive chain 104 may heat the material and form threads or other features that can supply positive gripping traction into the material. In the next stage, a gear or the like matching these features can be used to advance the build material along the feed path.

In another aspect, the drive chain 104 may use bellows or any other collapsible or telescoping press to drive rods, billets, or similar units of build material into the liquefaction system 106. Similarly, a piezoelectric or linear stepper drive may be used to advance a unit of build media in an indexed fashion using discrete mechanical increments of advancement in a non-continuous sequence of steps.

The liquefaction system 106 may employ a variety of techniques to heat a metal (e.g., a BMG) to a temperature in the window between the glass transition temperature and the melting point, which will vary by alloy. The material may then be quenched during/after shape forming, either through the process of deposition or otherwise, in order to prevent formation of crystalline structures. In this aspect, it will be noted that prolonged, elevated temperatures may result in crystallization, and extended dwells should generally be avoided. The amount of time that a material may be maintained within a processing temperature window between the glass transition temperature (Tg) and the melting temperature (Tm) without crystallizing will depend upon the alloy-specific crystallization behavior.

Any number of heating techniques or heating systems may be used. In one aspect, electrical techniques such as inductive or resistive heating may be usefully applied to liquefy the build material 102. Thus, for example, the liquefaction system 106 may include a heating system such as an inductive heating system or a resistive heating system configured to inductively or resistively heat a chamber around the build material 102 to a temperature within the Tg-Tm window, or this may include a heating system such as an inductive heating system or a resistive heating to directly heat the material itself through an application of electrical energy. Because BMGs are metallic and conductive, they may be electrically heated through contact methods (e.g., resistive heating with applied current) or non-contact methods (e.g., induction heating using an external electromagnet to drive eddy currents within the material). When directly heating the build material 102, it may be useful to model the shape and size of the build material 102 in order to better control electrically-induced heating. This may include estimates or actual measurements of shape, size, mass, and so forth, as well as information about bulk electromagnetic properties of the build material 102.

It will be appreciated that magnetic forces may be used in other ways to assist a fabrication process as contemplated herein. For example, magnetic forces may be applied, in particular to ferrous metals, for exertion of force to control a path of the build material 102. This may be particularly useful in transitional scenarios such as where a BMG is heated above the melt temperature in order to promote crystallization at an interface between an object and a support structure. In these instances, magnetic forces might usefully supplement surface tension to retain a melted alloy within a desired region of a layer.

In order to facilitate resistive heating of the build material 102, one or more contact pads, probes, or the like may be positioned within the feed path for the material in order to provide locations for forming a circuit through the material at the appropriate location(s). In order to facilitate induction heating, one or more electromagnets may be positioned at suitable locations adjacent to the feed path and operated, e.g., by the control system 118, to heat the build material 102 internally through the creation of eddy currents. In one aspect, both of these techniques may be used concurrently to achieve a more tightly controlled or more evenly distributed electrical heating within the build material 102. The printer 101 may also be instrumented to monitor the resulting heating in a variety of ways. For example, the printer 101 may monitor power delivered to the inductive or resistive circuits. The printer 101 may also or instead measure temperature of the build material 102 or surrounding environment at any number of locations. In another aspect, the temperature of the build material 102 may be inferred by measuring, e.g., the amount of force required to drive the build material 102 through a nozzle 110 or other portion of the feed path, which may be used as a proxy for the viscosity of the build material 102. More generally, any techniques suitable for measuring temperature or viscosity of the build material 102 and responsively controlling applied electrical energy may be used to control liquefaction for a metal FFF process as contemplated herein.

The liquefaction system 106 may also or instead include any other heating systems suitable for applying heat to the build material 102 at a temperature within the Tg-Tm window. This may, for example include techniques for locally or globally augmenting heating using, e.g., chemical heating, combustion, laser heating or other optical heating, radiant heating, ultrasound heating, electronic beam heating, and so forth.

In one aspect, the printer 101 may be augmented with a system for controlled delivery of amorphous metal powders that can be deposited in and around an object 112 during fabrication, or to form some or all of the object, and the powder can be sintered with a laser heating process that raises a temperature of the metal powder enough to bond with neighboring particles but not enough to recrystallize the material. This technique may be used, for example, to fabricate an entire object out of a powderized amorphous alloy, or this technique may be used to augment a fused filament fabrication process, e.g., by providing a mechanism to mechanically couple two or more objects fabricated within the build chamber, or to add features before, during, or after an independent fused filament fabrication process.

The liquefaction system 106 may include a shearing engine. The shearing engine may create shear within the build material 102 as it is heated in order to prevent crystallization, particularly when the heating approaches the melting temperature or the build material 102 is maintained at an elevated temperature for an extended period of time. A variety of techniques may be employed by the shearing engine. In one aspect, the bulk media may be axially rotated as it is fed along the feed path into the liquefaction system 106. In another aspect, one or more ultrasonic transducers may be used to introduce shear within the heated material. Similarly, a screw, post, arm, or other physical element may be placed within the heated media and rotated or otherwise actuated to mix the heated material.

The robotics 108 may include any robotic components or systems suitable for moving the nozzles 110 in a three-dimensional path relative to the build plate 114 while extruding build material 102 in order to fabricate the object 112 from the build material 102 according to a computerized model of the object. A variety of robotics systems are known in the art and suitable for use as the robotics 108 contemplated herein. For example, the robotics 108 may include a Cartesian coordinate robot or x-y-z robotic system employing a number of linear controls to move independently in the x-axis, the y-axis, and the z-axis within the build chamber 116. Delta robots may also or instead be usefully employed, which can, if properly configured, provide significant advantages in terms of speed and stiffness, as well as offering the design convenience of fixed motors or drive elements. Other configurations such as double or triple delta robots can increase range of motion using multiple linkages. More generally, any robotics suitable for controlled positioning of a nozzle 110 relative to the build plate 114, especially within a vacuum or similar environment, may be usefully employed, including any mechanism or combination of mechanisms suitable for actuation, manipulation, locomotion, and the like within the build chamber 116.

The robotics 108 may position the nozzle 110 relative to the build plate 114 by controlling movement of one or more of the nozzle 110 and the build plate 114. For example, in an aspect, the nozzle 110 is operably coupled to the robotics 108 such that the robotics 108 position the nozzle 110. The build plate 114 may also or instead be operably coupled to the robotics 108 such that the robotics 108 position the build plate 114. Or some combination of these techniques may be employed, such as by moving the nozzle 110 up and down for z-axis control, and moving the build plate 114 within the x-y plane to provide x-axis and y-axis control. In some such implementations, the robotics 108 may translate the build plate 114 along one or more axes, and/or may rotate the build plate 114.

It will be understood that a variety of arrangements and techniques are known in the art to achieve controlled linear movement along one or more axes, and/or controlled rotational motion about one or more axes. The robotics 108 may, for example, include a number of stepper motors to independently control a position of the nozzle 110 or build plate 114 within the build chamber 116 along each axis, e.g., an x-axis, a y-axis, and a z-axis. More generally, the robotics 108 may include without limitation various combinations of stepper motors, encoded DC motors, gears, belts, pulleys, worm gears, threads, and the like. Any such arrangement suitable for controllably positioning the nozzle 110 or build plate 114 may be adapted to use with the additive manufacturing system 100 described herein.

The nozzles 110 may include one or more nozzles for extruding the build material 102 that has been propelled with the drive chain 104 and heated with the liquefaction system 106. The nozzles 110 may include a number of nozzles that extrude different types of material so that, for example, a first nozzle 110 extrudes a metal build material while a second nozzle 110 extrudes a support material in order to support bridges, overhangs, and other structural features of the object 112 that would otherwise violate design rules for fabrication with the metal build material. In another aspect, one of the nozzles 110 may deposit a material, such as a thermally compatible polymer and/or a material loaded with fibers to increase tensile strength or otherwise improve mechanical properties.

In one aspect, the nozzle 110 may include one or more ultrasound transducers 130 as described herein. Ultrasound may be usefully applied for a variety of purposes in this context. In one aspect, the ultrasound energy may facilitate extrusion by mitigating adhesion of a metal (e.g., a BMG) to interior surfaces of the nozzle 110. In another aspect, the ultrasonic energy can be used to break up a passivation layer on a prior layer of printed media so that better layer-to-layer adhesion can be obtained, e.g., from the direct bond between layers of metal without any intervening passivation layer. Thus, in one aspect, a nozzle of a metal FFF printer may include an ultrasound transducer operable to improve extrusion through a nozzle by reducing adhesion to the nozzle while concurrently improving layer-to-layer bonding by breaking up a passivation layer on target media from a previous layer.

In another aspect, the nozzle 110 may include an induction heating element, resistive heating element, or similar components to directly control the temperature of the nozzle 110. This may be used to augment a more general liquefaction process along the feed path through the printer 101, e.g., to maintain a temperature of the build material 102 between Tm and Tg, or this may be used for more specific functions, such as de-clogging a print head by heating the build material 102 above Tm to melt the build material 102 into a liquid state. While it may be difficult or impossible to control deposition in this liquid state, the heating can provide a convenient technique to reset the nozzle 110 without more severe physical intervention such as removing vacuum to disassemble, clean, and replace affected components.

In another aspect, the nozzle 110 may include an inlet gas, e.g., an inert gas, to cool media at the moment it exits the nozzle 110. More generally, the nozzle 110 may include any cooling system for applying a cooling fluid to a bulk metallic glass or other build material 102 as it exits the nozzle 110. This gas jet may, for example, immediately stiffen extruded material to facilitate extended bridging, larger overhangs, or other structures that might otherwise include support structures underneath.

In another aspect, the nozzle 110 may include one or more mechanisms to flatten a layer of deposited material and apply pressure to bond the layer to an underlying layer. For example, a heated nip roller, caster, or the like may follow the nozzle 110 in its path through an x-y plane of the build chamber 116 to flatten the deposited (and still pliable) layer. The nozzle 110 may also or instead integrate a forming wall, planar surface, or the like to additionally shape or constrain an extrudate as it is deposited by the nozzle 110. The nozzle 110 may usefully be coated with a non-stick material (which may vary according to the build material 102 being used) in order to facilitate more consistent shaping and smoothing by this tool.

In an aspect, the nozzle 110 may include a reservoir, a heater configured to maintain a build material (e.g., a metal or metallic alloy) within the reservoir in a liquid or otherwise extrudable form, and an outlet. The components of the nozzle 110, e.g., the reservoir and the heater, may be contained within a housing or the like.

In an aspect, the nozzle 110 may include a mechanical device, such as a valve, a plate with metering holes, or some other suitable mechanism to mechanically control build material 102 exiting the nozzle 110

The nozzle 110 or a portion thereof may be movable within the build chamber 116 by the robotics 108 (e.g., a robotic positioning assembly), e.g., relative to the build plate 114. For example, the nozzle 110 may be movable by the robotics 108 along a tool path while depositing a build material (e.g., a liquid metal) to form the object 112, or the build plate 114 may move within the build chamber 116 while the nozzle 110 remains stationary.

Where multiple nozzles 110 are provided, a second nozzle may usefully provide any of a variety of additional build materials. This may, for example, include other metals (e.g., other BMGs) with different or similar thermal characteristics (e.g., Tg, Tm), thermally matched polymers (e.g., with a glass transition temperature matched to a lower viscosity window of a BMG) to support multi-material printing, support material, other metals and alloys, and the like. In one aspect, two or more nozzles 110 may provide two or more different metals (e.g., BMGs) with different super-cooled liquid regions. The material with the lower super cooled liquid region can be used as a support material and the material with the higher temperature region can be formed into the object 112. In this manner, the deposition of the hotter, higher temperature material (in the object 112) onto an underlying layer of the lower temperature support material can cause the lower temperature material to melt and/or crystalize at the interface between the two, rendering the interface brittle and easy to remove with the application of mechanical force. Conveniently, the bulk form of the underlying support structure will not generally become crystallized due to this application of surface heating, so the support structure can retain its bulk form for removal at the embrittled interface as a single piece. The control system 118 may be configured to control alternate use of these different build materials 102 to create an inherently brittle interface layer between a support structure 113 and an object 112. Thus, in one aspect, there is disclosed herein a printer that fabricates a layer of a support structure using a first bulk metallic glass with a first super cooled liquid region, and that fabricates a layer of an object on top of the layer of the support structure using a second bulk metallic glass with a second super-cooled liquid region having a minimum temperature and/or temperature range greater than the first super-cooled liquid region.

Thus, as described above, in some implementations, a three-dimensional printer 101 may include a second nozzle 110 that extrudes a second bulk metallic glass. A second nozzle 110 may also be used to extrude any number of other useful materials such as a wax, a second metal dissimilar from a first material used in a first nozzle, a polymer, a ceramic, or some other suitable material. The control system 118 may, for example, be configured to operate the first and second nozzles simultaneously, independently of one other, or in some other suitable fashion to generate layers that include the first material, the second material, or both.

The object 112 may be any object suitable for fabrication using the techniques contemplated herein. This may include functional objects such as machine parts, aesthetic objects such as sculptures, or any other type of objects, as well as combinations of objects that can be fit within the physical constraints of the build chamber 116 and build plate 114. Some structures such as large bridges and overhangs cannot be fabricated directly using FFF because there is no underlying physical surface onto which a material can be deposited. In these instances, a support structure 113 may be fabricated, preferably of a soluble or otherwise readily removable material, in order to support a corresponding feature.

The build plate 114 may be formed of any surface or substance suitable for receiving deposited metal or other materials from the nozzles 110. The surface of the build plate 114 may be rigid and substantially planar. In one aspect, the build plate 114 may be heated, e.g., resistively or inductively, to control a temperature of the build chamber 116 or a surface upon which the object 112 is being fabricated. This may, for example, improve adhesion, prevent thermally induced deformation or failure, and facilitate relaxation of stresses within the fabricated object. In another aspect, the build plate 114 may be a deformable structure or surface that can bend or otherwise physically deform in order to detach from a rigid object 112 formed thereon. The build plate 114 may also include contacts providing a circuit path for internal ohmic heating of the object 112 or an interface between the object 112 and build material 102 exiting the nozzle 110.

The build plate 114 may be movable within the build chamber 116, e.g., by a positioning assembly (e.g., the same robotics 108 that position the nozzle 110 or different robotics). For example, the build plate 114 may be movable along a z-axis (e.g., up and down—toward and away from the nozzle 110), or along an x-y plane (e.g., side to side, for instance in a pattern that forms the tool path or that works in conjunction with movement of the nozzle 110 to form the tool path for fabricating the object 112), or some combination of these. In an aspect, the build plate 114 is rotatable.

The build plate 114 may include a temperature control system for maintaining or adjusting a temperature of at least a portion of the build plate 114. The temperature control system may be wholly or partially embedded within the build plate 114. The temperature control system may include without limitation one or more of a heater, coolant, a fan, a blower, or the like. In implementations, temperature may be controlled by induction heating of the printed part, which may be metallic and therefore conductive.

In general, the build chamber 116 houses the build plate 114 and the nozzle 110, and maintains a build environment suitable for fabricating the object 112 on the build plate 114 from the bulk metallic glass or other build material 102. This may, for example, include a vacuum environment, an oxygen depleted environment, a heated environment, and inert gas environment, and so forth. The build chamber 116 may be any chamber suitable for containing the build plate 114, an object 112, and any other components of the printer 101 used within the build chamber 116 to fabricate the object 112.

The printer 101 may include a vacuum pump 124 coupled to the build chamber 116 and operable to create a vacuum within the build chamber 116. A number of suitable vacuum pumps are known in the art and may be adapted for use as the vacuum pump 124 contemplated herein. The build chamber 116 may be environmentally sealed chamber so that it can be evacuated with the vacuum pump 124 or any similar device in order to provide a vacuum environment for fabrication. This may be particularly useful where oxygen causes a passivation layer that might weaken layer-to-layer bonds in a fused filament fabrication process as contemplated herein. The build chamber 116 may be hermetically sealed, air-tight, or otherwise environmentally sealed. The environmentally sealed build chamber 116 can be purged of oxygen, or filled with one or more inert gases in a controlled manner to provide a stable build environment. Thus, for example, the build chamber 116 may be substantially filled with one or more inert gases such as argon or any other gases that do not interact significantly with heated bulk metallic glasses or other build materials 102 used by the printer 101. The environmental sealing may include thermal sealing, e.g., preventing an excess of heat transfer from the build volume to an external environment, and vice-versa. The seal of the build chamber 116 may also or instead include a pressure seal to pressurize the build chamber 116, e.g., to provide a positive pressurization that resists infiltration by surrounding oxygen or the like. To maintain the seal of the build chamber 116, any openings in an enclosure of the build chamber 116, e.g., for build material feeds, electronics, and so on, may include suitably corresponding seals or the like.

In some implementations, an environmental control element such as an oxygen getter may be included within the support structure material to provide localized removal of oxygen or other gases. Some of these techniques may mitigate the need for build chamber ventilation, however, where such ventilation is needed an air filter such as a charcoal filter may usefully be employed to filter gases that are exiting the build chamber 116.

One or more passive or active oxygen getters 126 or other similar oxygen absorbing material or system(s) may usefully be employed within the build chamber 116 to take up free oxygen. The oxygen getter 126 may, for example, include a deposit of a reactive material coating an inside surface of the build chamber 116 or a separate object placed therein that completes and maintains the vacuum by combining with or adsorbing residual gas molecules. In one aspect, the oxygen getters 126 may include any of a variety of materials that preferentially react with oxygen including, e.g., materials based on titanium, aluminum, and so forth. In another aspect, the oxygen getters 126 may include a chemical energy source such as a combustible gas, gas torch, catalytic heater, Bunsen burner, or other chemical and/or combustion source that reacts to extract oxygen from the environment. There are a variety of low-CO and NOx catalytic burners that may be suitably employed for this purpose without outputting potentially harmful CO. The oxygen getters 126 may also or instead include an oxygen filter, an electrochemical oxygen pump, a cover gas supply, an air circulator, and the like. Thus, in implementations, purging the build chamber 116 of oxygen may include one or more of applying a vacuum to the build chamber 116, supplying an inert gas to the build chamber 116, placing an oxygen getter 126 inside the build chamber 116, applying an electrochemical oxygen pump to the build chamber 116, cycling the air inside the build chamber 116 through an oxygen filter (e.g., a porous ceramic filter), and the like.

In one aspect, the oxygen getters 126, or more generally, gas getters, may be deposited as a support material using one of the nozzles 110, which facilitates replacement of the gas getter with each new fabrication run and can advantageously position the gas getter(s) near printed media in order to more locally remove passivating gases where new material is being deposited onto the fabricated object. The oxygen getter 126 may also or instead be deposited as a separate material during a build process. Thus, in one aspect, there is disclosed herein a process for fabricating a three-dimensional object from a metal including co-fabricating a physically adjacent structure (which may or may not directly contact the three-dimensional object) containing an agent to remove passivating gases around the three-dimensional object. Other techniques may be similarly employed to control reactivity of the environment within the build chamber 116. For example, the build chamber 116 may be filled with an inert gas or the like to prevent oxidation.

The build chamber 116 may include a temperature control system 128 for maintaining or adjusting a temperature of at least a portion of a volume of the build chamber 116 (the build volume). The temperature control system 128 may include without limitation one or more of a heater, a coolant, a fan, a blower, or the like. The temperature control system 128 may use a fluid or the like as a heat exchange medium for transferring heat as desired within the build chamber 116. The temperature control system 128 may also or instead move air (e.g., circulate air) within the build chamber 116 to control temperature, to provide a more uniform temperature, or to transfer heat within the build chamber 116.

The temperature control system 128, or any of the temperature control systems described herein (e.g., a temperature control system of the liquefaction system 106 or a temperature control system of the build plate 114) may include one or more active devices such as resistive elements that convert electrical current into heat, Peltier effect devices that heat or cool in response to an applied current, or any other thermoelectric heating and/or cooling devices. Thus, the temperature control systems discussed herein may include a heater that provides active heating to the components of the printer 101, a cooling element that provides active cooling to the components of the printer 101, or a combination of these. The temperature control systems may be coupled in a communicating relationship with the control system 118 in order for the control system 118 to controllably impart heat to or remove heat from the components of the printer 101. Thus, the temperature control systems may include an active cooling element positioned within or adjacent to the components of the printer 101 to controllably cool the components of the printer 101. It will be understood that a variety of other techniques may be employed to control a temperature of the components of the printer 101. For example, the temperature control systems may use a gas cooling or gas heating device such as a vacuum chamber or the like in an interior thereof, which may be quickly pressurized to heat the components of the printer 101 or vacated to cool the components of the printer 101 as desired. As another example, a stream of heated or cooled gas may be applied directly to the components of the printer 101 before, during, and/or after a build process. Any device or combination of devices suitable for controlling a temperature of the components of the printer 101 may be adapted to use as the temperature control systems described herein.

It will be further understood that the temperature control system 128 for the build chamber 116, the temperature control system of the liquefaction system 106, and the temperature control system of the build plate 114, may be included in a singular temperature control system (e.g., included as part of the control system 118 or otherwise in communication with the control system 118) or they may be separate and independent temperature control systems. Thus, for example, a heated build plate or a heated nozzle may contribute to heating of the build chamber 116 and form a component of a temperature control system 128 for the build chamber 116.

The build chamber 116 may also or instead include a pressure control system for maintaining or adjusting a pressure of at least a portion of a volume of the build chamber 116, for example by increasing the pressure relative to an ambient pressure to provide a pressurized build chamber 116, or decreasing the pressure relative to an ambient pressure to provide a vacuum build chamber 116. As described above a vacuum build chamber 116 may usefully integrate oxygen getters or other features to assist in depleting gases from the build chamber 116. Similarly, where a pressurized build chamber 116 is used, the build chamber 116 may be filled and pressurized with an inert gas or the like to provide a controlled environment for fabrication.

Objects fabricated from metal may be relatively heavy and difficult to handle. To address this issue a scissor table or other lifting mechanism may be provided to lift fabricated objects out of the build chamber 116. An intermediate chamber may usefully be employed for transfers of printed objects out of the build chamber 116, particularly where the build chamber 116 maintains a highly heated, pressurized or depressurized environment, or any other environment generally incompatible with direct exposure to an ambient environment.

In general, a control system 118 may include a controller or the like configured to control operation of the printer 101. The controller may, for example, be configured by computer executable code to control a heating system (such as the liquefaction system 106), a drive system (such as the drive chain 104), and a robotic system (such as the robotics 108) to fabricate the object 112 on the build plate 114 from the bulk metallic glass or any other suitable build material 102. The control system 118 may be coupled to other components of the additive manufacturing system 100 for controlling the function thereof in a coordinated manner to fabricate the object 112 from the build material 102. For example, the control system 118 may be operably coupled to the nozzle 110 and the robotics 108. The control system 118 may control aspects of the nozzle 110 such as a deposition rate of build material, an amount of deposited build material, and so forth. The control system 118 may also control aspects of the robotics 108, such as the positioning and movement of either or both of the nozzle 110 or the build plate 114 relative to one another.

In general, the control system 118 may be operable to control the components of the additive manufacturing system 100, such as the nozzle 110, the build plate 114, the robotics 108, the various temperature and pressure control systems, and any other components of the additive manufacturing system 100 described herein to fabricate the object 112 from the build material 102 based on a three-dimensional model 122 describing the object 112. The control system 118 may include any combination of software and/or processing circuitry suitable for controlling the various components of the additive manufacturing system 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the control system 118 may include a microprocessor or other processing circuitry with sufficient computational power to provide related functions such as executing an operating system, providing a graphical user interface (e.g., to a display coupled to the control system 118 or printer 101), convert three-dimensional models 122 into tool instructions, and operate a web server or otherwise host remote users and/or activity through a network interface 162 for communication through a network 160.

The control system 118 may include a processor and memory, as well as any other co-processors, signal processors, inputs and outputs, digital-to-analog or analog-to-digital converters, and other processing circuitry useful for controlling and/or monitoring a fabrication process executing on the printer 101, e.g., by providing instructions to control operation of the printer 101. To this end, the control system 118 may be coupled in a communicating relationship with a supply of the build material 102, the drive chain 104, the liquefaction system 106, the nozzles 110, the build plate 114, the robotics 108, and any other instrumentation or control components associated with the build process such as temperature sensors, pressure sensors, oxygen sensors, vacuum pumps, and so forth.

The control system 118 may generate machine ready code for execution by the printer 101 to fabricate the object 112 from the three-dimensional model 122. In another aspect, the machine-ready code may be generated by an independent computing device 164 based on the three-dimensional model 122 and communicated to the control system 118 through a network 160, which may include a local area network or an internetwork such as the Internet. The control system 118 may deploy a number of strategies to improve the resulting physical object structurally or aesthetically. For example, the control system 118 may use plowing, ironing, planing, or similar techniques where the nozzle 110 is run over existing layers of deposited material, e.g., to level the material, remove passivation layers, or otherwise prepare the current layer for a next layer of material and/or shape and trim the material into a final form. The nozzle 110 may include a non-stick surface to facilitate this plowing process, and the nozzle 110 may be heated and/or vibrated (using the ultrasound transducer) to improve the smoothing effect. In one aspect, this surface preparation may be incorporated into the initially-generated machine ready code. In another aspect, the printer 101 may dynamically monitor deposited layers and determine, on a layer-by-layer basis, whether additional surface preparation is necessary or helpful for successful completion of the object 112. Thus, in one aspect, there is disclosed herein a printer 101 that monitors a metal FFF process and deploys a surface preparation step with a heated or vibrating non-stick nozzle when a prior layer of the metal material is unsuitable for receiving additional metal material.

The control system 118 may employ pressure or flow rate as a process feedback signal. While temperature is frequently a critical physical quantity for a metal build, it may be difficult to accurately measure the temperature of metal throughout the feed path during a metal FFF process. However, the temperature can often be accurately inferred by the ductility of the build material 102, which can be accurately measured for bulk material based on how much work is being done to drive the material through a feed path. Thus, in one aspect, there is disclosed herein a printer 101 that measures a force applied to a metal build material by a drive chain 104 or the like, infers a temperature of the build material 102 based on the force (e.g., instantaneous force), and controls a liquefaction system 106 to adjust the temperature accordingly.

In another aspect, the control system 118 may control deposition parameters to modify the physical interface between support materials and an object 112. For example, while a support structure 113 is typically formed from a material different from the build material for the object 112, e.g., a soluble material or a softer or more brittle material, the properties of a bulk metallic glass can be modified to achieve similar results using the same print media. For example, the pressure applied by the nozzle 110, the temperature of liquefaction or the like may be controlled, either throughout the support structure 113 or specifically at the interface between the object 112 and the support structure 113, to change the mechanical properties. For example, a layer may be fabricated at a temperature near or above the melting temperature in order to cause melt and/or crystallization, resulting in a more brittle structure at the interface. Thus, in one aspect, there is disclosed herein a technique for fabricating an object 112 including fabricating a support structure 113 from a build material 102 that includes a bulk metallic glass, fabricating a top layer of the support structure 113 (or a bottom layer of the object 112) at a temperature sufficient to induce crystallization of the build material 102, and fabricating a bottom layer of an object 112 onto the top layer of the support structure 113 at a temperature between a glass transition temperature and a melting temperature. In another aspect, a passivating layer may be induced to reduce the strength of the bond between the support layer and the object layer, such as by permitting or encouraging oxidation between layers.

In general, a three-dimensional model 122 of the object 112 may be stored in a database 120 such as a local memory of a computing device used as the control system 118, or a remote database accessible through a server or other remote resource, or in any other computer-readable medium accessible to the control system 118. The control system 118 may retrieve a particular three-dimensional model 122 in response to user input, and generate machine-ready instructions for execution by the printer 101 to fabricate the corresponding object 112. This may include the creation of intermediate models, such as where a CAD model is converted into an STL model, or other polygonal mesh or other intermediate representation, which can in turn be processed to generate machine instructions for fabrication of the object 112 by the printer 101.

In operation, to prepare for the additive manufacturing of an object 112, a design for the object 112 may first be provided to a computing device 164. The design may be a three-dimensional model 122 included in a CAD file or the like. The computing device 164 may be any as described herein and may in general include any devices operated autonomously or by users to manage, monitor, communicate with, or otherwise interact with other components in the additive manufacturing system 100. This may include desktop computers, laptop computers, network computers, tablets, smart phones, smart watches, PDAs, or any other computing device that can participate in the system as contemplated herein. In one aspect, the computing device 164 is integral with the printer 101.

The computing device 164 may include the control system 118 as described herein or a component of the control system 118. The computing device 164 may also or instead supplement or be provided in lieu of the control system 118. Thus, unless explicitly stated to the contrary or otherwise clear from the context, any of the functions of the computing device 164 may be performed by the control system 118 and vice-versa. In another aspect, the computing device 164 is in communication with or otherwise coupled to the control system 118, e.g., through a network 160, which may be a local area network that locally couples the computing device 164 to the control system 118 of the printer 101, or an internetwork such as the Internet that remotely couples the computing device 164 in a communicating relationship with the control system 118.

The computing device 164 (and the control system 118) may include a processor 166 and a memory 168 to perform the functions and processing tasks related to management of the additive manufacturing system 100 as described herein. The processor 166 and memory 168 may be any as described herein or otherwise known in the art. In general, the memory 168 may contain computer code that can be executed by the processor 166 to perform the various steps described herein, and the memory may further store data such as sensor data and the like generated by other components of the additive manufacturing system 100.

One or more ultrasound transducers 130 or similar vibration components may be usefully deployed at a variety of locations within the printer 101. For example, a vibrating transducer may be used to vibrate pellets, particles, or other similar media as it is distributed from a hopper of build material 102 into the drive chain 104. Where the drive chain 104 includes a screw drive or similar mechanism, ultrasonic agitation in this manner can more uniformly distribute pellets to prevent jamming or inconsistent feeding.

In another aspect, an ultrasonic transducer 130 may be used to encourage a relatively high-viscosity metal media such as a heated bulk metallic glass to deform and extrude through a pressurized die at a hot end of the nozzle 110. One or more dampers, mechanical decouplers, or the like may be included between the nozzle 110 and other components in order to isolate the resulting vibration within the nozzle 110.

During fabrication, detailed data may be gathered for subsequent use and analysis. This may, for example, include data from a sensor and computer vision system that identifies errors, variations, or the like that occur in each layer of an object 112. Similarly, tomography or the like may be used to detect and measure layer-to-layer interfaces, aggregate part dimensions, and so forth. This data may be gathered and delivered with the object to an end user as a digital twin 140 of the object 112, e.g., so that the end user can evaluate how variations and defects might affect use of the object 112. In addition to spatial/geometric analysis, the digital twin 140 may log process parameters including, e.g., aggregate statistics such as weight of material used, time of print, variance of build chamber temperature, and so forth, as well as chronological logs of any process parameters of interest such as volumetric deposition rate, material temperature, environment temperature, and so forth.

The digital twin 140 may also usefully log a thermal history of the build material 102, e.g., on a voxel-by-voxel or other volumetric basis within the completed object 112. Thus, in one aspect, the digital twin 140 may store a spatial temporal map of thermal history for build material that is incorporated into the object 112, which may be used, e.g., in order to estimate a crystallization state of bulk metallic glass within the object 112 and, where appropriate, initiate remedial action during fabrication. The control system 118 may use this information during fabrication, and may be configured to adjust a thermal parameter of a fused filament fabrication system or the like during fabrication according to the spatial temporal map of thermal history.

The printer 101 may include a camera 150 or other optical device. In one aspect, the camera 150 may be used to create the digital twin 140 or provide spatial data for the digital twin 140. The camera 150 may more generally facilitate machine vision functions or facilitate remote monitoring of a fabrication process. Video or still images from the camera 150 may also or instead be used to dynamically correct a print process, or to visualize where and how automated or manual adjustments should be made, e.g., where an actual printer output is deviating from an expected output. The camera 150 can be used to verify a position of the nozzle 110 and/or build plate 114 prior to operation. In general, the camera 150 may be positioned within the build chamber 116, or positioned external to the build chamber 116, e.g., where the camera 150 is aligned with a viewing window formed within a chamber wall.

The additive manufacturing system 100 may further include one or more sensors 170. In an aspect, the sensor 170 may be in communication with the control system 118, e.g., through a wired or wireless connection (e.g., through a data network 160). The sensor 170 may be configured to detect progress of fabrication of the object 112, and to send a signal to the control system 118 where the signal includes data characterizing progress of fabrication of the object 112. The control system 118 may be configured to receive the signal, and to adjust at least one parameter of the additive manufacturing system 100 in response to the detected progress of fabrication of the object 112.

The one or more sensors 170 may include without limitation one or more of a contact profilometer, a non-contact profilometer, an optical sensor, a laser, a temperature sensor, motion sensors, an imaging device, a camera, an encoder, an infrared detector, a volume flow rate sensor, a weight sensor, a sound sensor, a light sensor, a sensor to detect a presence (or absence) of an object, and so on.

As discussed herein, the control system 118 may adjust a parameter of the additive manufacturing system 100 in response to the sensor 170. The adjusted parameter may include a temperature of the build material 102, a temperature of the build chamber 116 (or a portion of a volume of the build chamber 116), and a temperature of the build plate 114. The parameter may also or instead include a pressure such as an atmospheric pressure within the build chamber 116. The parameter may also or instead include an amount or concentration of an additive for mixing with the build material such as a strengthening additive, a colorant, an embrittlement material, and so forth.

In some implementations, the control system 118 may (in conjunction with one or more sensors 170) identify the build material 102 used in the additive manufacturing system 100, and may in turn adjust a parameter of the additive manufacturing system 100 based on the identification of the build material 102. For example, the control system 118 may adjust a temperature of the build material 102, an actuation of the nozzle 110, a position of one or more of the build plate 114 and the nozzle 110 via the robotics 108, a volume flow rate of build material 102, and the like. In some such implementations, the nozzle 110 is further configured to transmit a signal to the control system 118 indicative of any sensed condition or state such as a conductivity of the build material 102, a type of the build material 102, a diameter of an outlet of the nozzle 110, or any other useful information. The control system 118 may receive any such signal and control and aspect of the build process in response.

In one aspect, the one or more sensors 170 may include a sensor system configured to volumetrically monitor a temperature of a build material 102 such as a bulk metallic glass. This may include surface measurements where available, based on any contact or non-contact temperature measurement technique. This may also or instead include an estimation of the temperature within an interior of the build material 102 at different points along the feed path and within the completed object. Using this accumulated information, a thermal history may be created that includes the temperature over time for each voxel of build material within the completed object 112, all of which may be stored in the digital twin 140 described below and used for in-process control of thermal parameters or post-process review and analysis of the object 112.

The additive manufacturing system 100 may include, or be connected in a communicating relationship with, a network interface 162. The network interface 162 may include any combination of hardware and software suitable for coupling the control system 118 and other components of the additive manufacturing system 100 in a communicating relationship to a remote computer (e.g., the computing device 164) through a data network 160. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to a local area network or the like that is in turn coupled to a wide area data network such as the Internet. This may also or instead include hardware/software for a WiMAX connection or a cellular network connection (using, e.g., CDMA, GSM, LTE, or any other suitable protocol or combination of protocols). Consistently, the control system 118 may be configured to control participation by the additive manufacturing system 100 in any network 160 to which the network interface 162 is connected, such as by autonomously connecting to the network 160 to retrieve printable content, or responding to a remote request for status or availability of the printer 101.

Other useful features may be integrated into the printer 101 described above. For example, a solvent or other material may be usefully applied to a specific surface of the object 112 during fabrication, e.g., to modify its properties. The added material may, for example, intentionally oxidize or otherwise modify a surface of the object 112 at a particular location or over a particular area in order to provide a desired electrical, thermal, optical, mechanical or aesthetic property. This capability may be used to provide aesthetic features such as text or graphics, or to provide functional features such as a window for admitting RF signals. This may also be used to apply a release layer for breakaway support.

A component handling device can be included for retrieving the printed object 112 from the build chamber 116 upon completion of the printing process, and/or for inserting heavy media. The component handling device can include a mechanism to elevate the printed object 112 (e.g., a scissor table). The lifting force of the handling device can be generated via a pneumatic or hydraulic lever system, or any other suitable mechanical system.

In some implementations, the computing device 164 or the control system 118 may identify or create a support structure 113 that supports a portion of the object 112 during fabrication. In general, the support structure 113 is a sacrificial structure that is removed after fabrication has been completed. In some such implementations, the computing device 164 may identify a technique for manufacturing the support structure 113 based on the object 112 being manufactured, the materials being used to manufacture the object 112, and user input. The support structure 113 may be fabricated from a high-temperature polymer or other material that will form a weak bond to the build material 102. In another aspect, an interface between the support structure 113 and the object 112 may be manipulated to weaken the interlayer bond to facilitate the fabrication of breakaway support.

Figure 2:
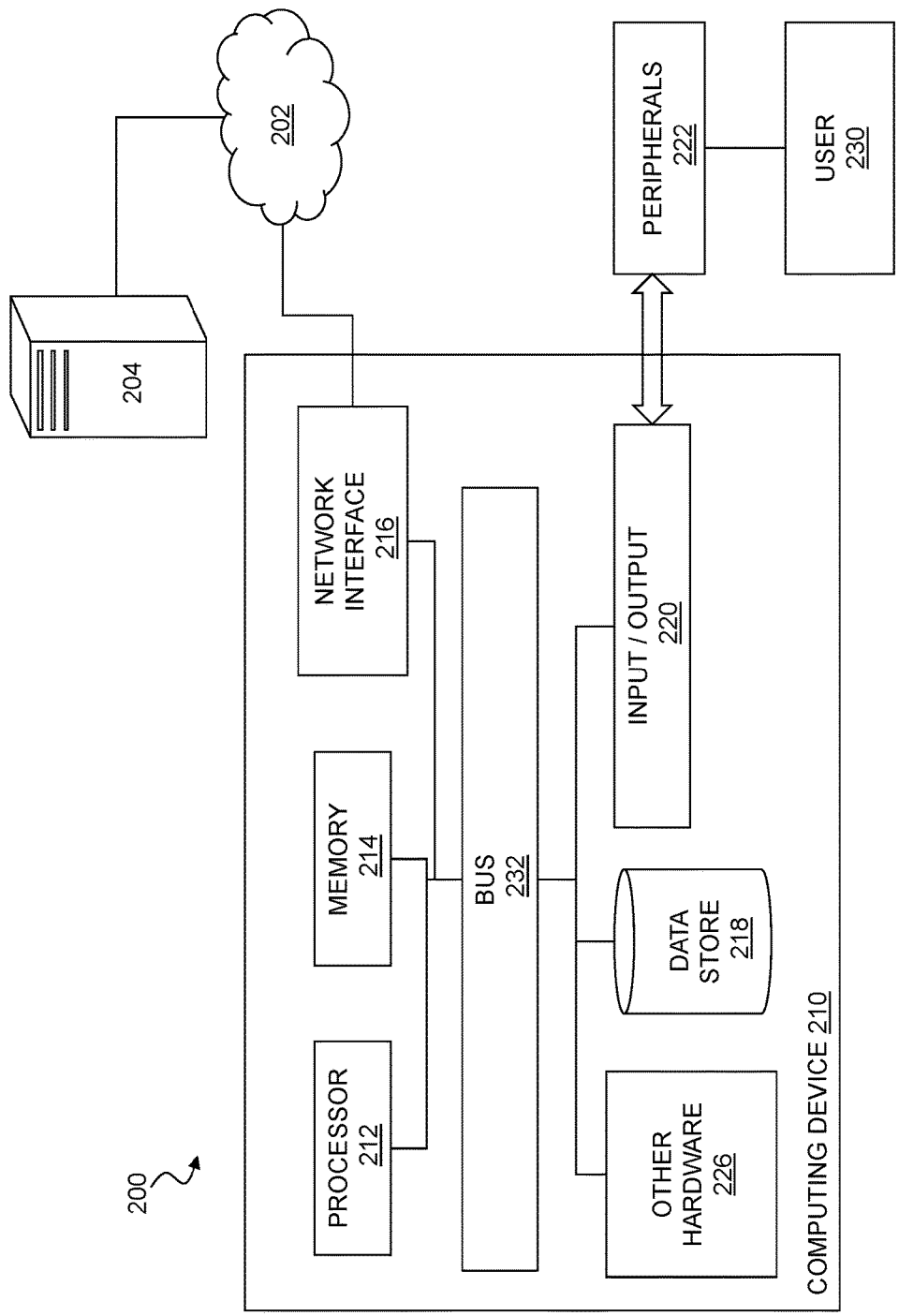
FIG. 2 is a block diagram of a computer system.

FIG. 2 is a block diagram of a computer system, which may include any of the computing devices or control systems described herein. The computer system 200 may include a computing device 210, which may also be connected to an external device 204 through a network 202. In general, the computing device 210 may be or include any type of computing device described herein such as the computing device or control system described above. By way of example, the computing device 210 may include any of the controllers described herein (or vice-versa), or otherwise be in communication with any of the controllers or other devices described herein. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device, just as some examples. The computing device 210 may also or instead include a server, or it may be disposed on a server.

The computing device 210 may be used for any of the devices and systems described herein, or for performing the steps of any method described herein. For example, the computing device 210 may include a controller or any computing devices described therein. In certain aspects, the computing device 210 may be implemented using hardware (e.g., in a desktop computer), software (e.g., in a virtual machine or the like), or a combination of software and hardware, and the computing device 210 may be a standalone device, a device integrated into another entity or device, a platform distributed across multiple entities, or a virtualized device executing in a virtualization environment. By way of example, the computing device may be integrated into a three-dimensional printer, or a controller for a three-dimensional printer.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMAX-Advanced (IEEE 102.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include print management resources, gateways or other network devices, remote servers or the like containing content requested by the computing device 210, a network storage device or resource, a device hosting printing content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 220.

The processor 212 may be any as described herein, and in general be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, print instructions, digital models, program data, executables, and other software and data useful for controlling operation of the computing device 210 and configuring the computing device 210 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 210 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., Wi-Fi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 102.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMAX connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, digital models, print instructions, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a Wi-Fi accessory, or where an Ethernet connection is used to couple to a local network attached storage.

A peripheral 222 may include any device used to provide information to or receive information from the computing device 210. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, magnetic card readers, user interfaces, and so forth. In one aspect, the peripheral 222 may serve as the network interface 216, such as with a USB device configured to provide communications via short range (e.g., Bluetooth, Wi-Fi, Infrared, RF, or the like) or long range (e.g., cellular data or WiMAX) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 210 may be used as a peripheral 222 as contemplated herein.

Other hardware 226 may be incorporated into the computing device 210 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 210 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 210 may be deployed as a number of parallel processors synchronized to execute code together for improved performance, or the computing device 210 may be realized in a virtualized environment where software on a hypervisor or other virtualization management facility emulates components of the computing device 210 as appropriate to reproduce some or all of the functions of a hardware instantiation of the computing device 210.

Figure 3:
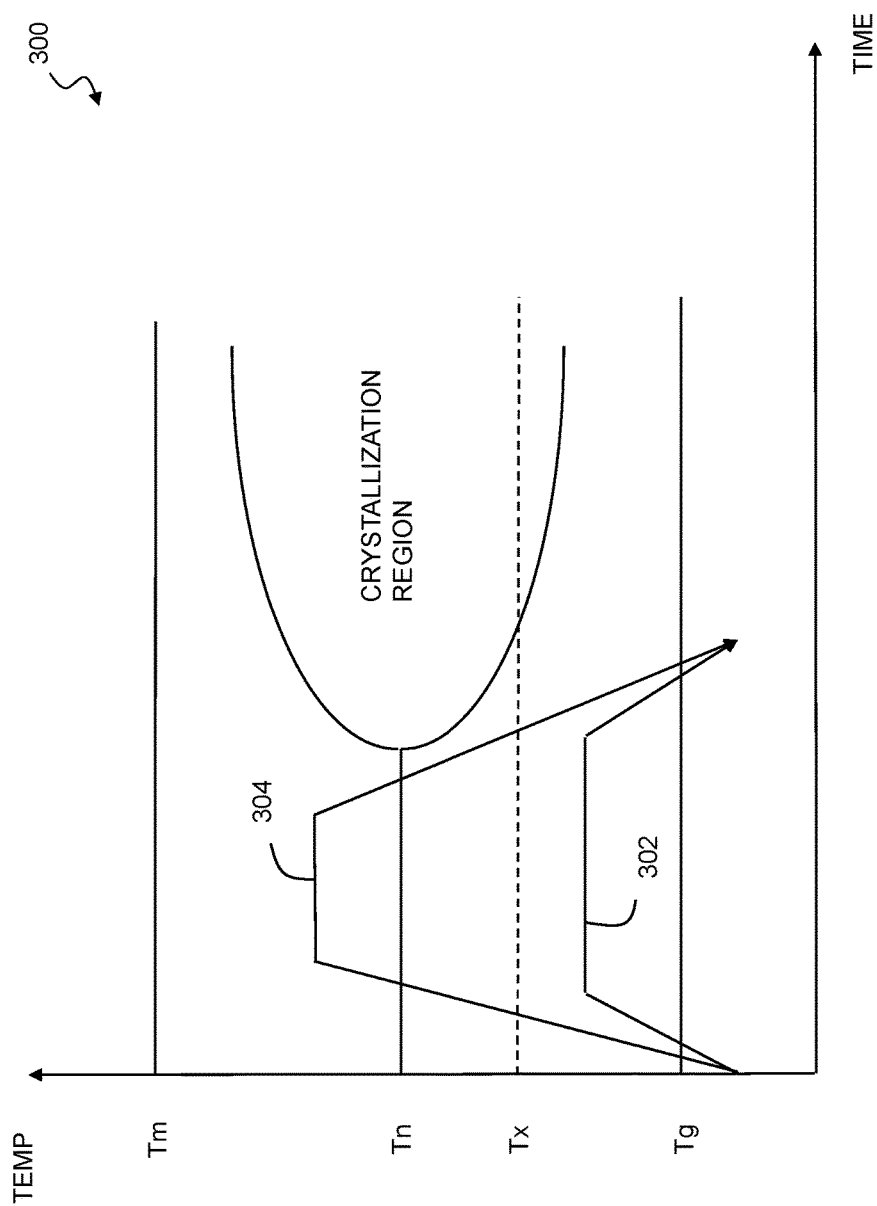
FIG. 3 shows a schematic of a time-temperature-transformation (T) diagram for an exemplary bulk solidifying amorphous alloy.

FIG. 3 shows the time-temperature-transformation (TTT) cooling curve 300 of an exemplary bulk solidifying amorphous alloy, with time on the x-axis and temperature on the y-axis. While other materials such as those described in commonly-owned U.S. patent application Ser. No. 15/059,256 filed on Mar. 2, 2016 (incorporated by reference herein in its entirety) provide useful properties for extrusion in a fused filament fabrication system, bulk metallic glasses may also be used for this purpose. Bulk-solidifying amorphous metals (also referred to herein as bulk metallic glasses) do not experience a liquid/solid crystallization transformation upon cooling, as with conventional metals. Instead, the non-crystalline form of the metal found at high temperatures (near a "melting temperature" Tm) becomes more viscous as the temperature is reduced (near to the glass transition temperature Tg), eventually taking on the physical properties of a conventional solid while maintaining an amorphous internal structure.

Even though there is no liquid/crystallization transformation for a bulk solidifying amorphous metal, a melting temperature, Tm, may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. In order to form a BMG, the cooling rate of the molten metal must be sufficiently high to avoid the elliptically-shaped region bounding the crystallized region in the TTT diagram of FIG. 3. In FIG. 3, Tn (also referred to as Tnose) is the critical crystallization temperature, Tx, where the rate of crystallization is the greatest and crystallization occurs in the shortest time scale.

The supercooled liquid region, the temperature region between Tg and Tx is a manifestation of a stability against crystallization that permits the bulk solidification of an amorphous alloy. In this temperature region, the bulk solidifying alloy can exist as a highly viscous liquid. The viscosity of the bulk solidifying alloy in the supercooled liquid region can vary between $10^{12}$ Pa s at the glass transition temperature down to $10^5$ Pa s at the crystallization temperature, the high-temperature limit of the supercooled liquid region. Liquids with such viscosities can undergo substantial plastic strain under an applied pressure, and this large plastic formability in the supercooled liquid region permits use in a fused filament fabrication system as contemplated herein. As a significant advantage, bulk metallic glasses that remain in the supercooled liquid region are not generally subject to oxidation or other rapid environmental degradation, thus typically requiring less control of the environment within a build chamber during fabrication than some other metal systems that might be used for fused filament fabrication.

The supercooled alloy may in general be formed or worked into a desired shape for use as a wire, rod, billet, or the like. In general, forming may take place simultaneously with fast cooling to avoid any subsequent thermoforming with a trajectory approaching the TTT curve. In superplastic forming (SPF), the amorphous BMG can be reheated into the supercooled liquid region without hitting the TTT curve where the available processing window could be much larger than die casting, resulting in better controllability of the process. The SPF process does not require fast cooling to avoid crystallization during cooling. Also, as shown by example trajectories 302 and 304, the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx. A variety of suitable metallic and nonmetallic elements useful for glass-forming alloys are described by way of example, in commonly-owned U.S. Prov. App. No. 62/268,458, filed on Dec. 16, 2015, the entire content of which is incorporated by reference herein.

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or simply "crystallinity") of an alloy can refer to the amount of the crystalline phase present in the alloy or a fraction of crystals present in the alloy. The fraction can refer to volume fraction or weight fraction, depending on the context. Similarly, amorphicity expresses how amorphous or unstructured an amorphous alloy is. Amorphicity can be measured relative to a degree of crystallinity. Thus, an alloy having a low degree of crystallinity may have a high degree of amorphicity and vice versa. By way of quantitative example, an alloy having 60 vol % crystalline phase may have a 40 vol % amorphous phase.

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly-ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." As used herein, the term bulk metallic glass ("BMG") refers to an alloy with a wholly or partially amorphous microstructure.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which omits dislocation defects or the like that might limit the strength of crystalline alloys. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used for fused filament fabrication. Alternatively, a BMG low in element(s) that tend to cause embrittlement (e.g., Ni) can be used. For example, a Ni-free BMG can be used for improved ductility.

As described above, the degree of amorphicity (and conversely the degree of crystallinity) can be measured by fraction of crystals present in the alloy, e.g., in units of volume, weight or the like. A partially amorphous composition can refer to a composition with an amorphous phase of at least about 5 vol %, 10 vol %, 20 vol %, 40 vol %, 60 vol %, 80 vol %, 90 vol %, or any other amount. Accordingly, a composition that is at least substantially amorphous can refer to one with an amorphous phase of at least about 90 vol %, 95 vol %, 98 vol %, 99 vol %, 99.9 vol %, or any other similar range or amount. In one embodiment, a substantially amorphous composition can have some incidental, insignificant amount of crystalline phase present therein.

In another aspect, the build material may include an off-eutectic alloy with a working temperature range in which the alloy is in a multi-phase state, e.g., with the eutectic in a liquid phase while a related alloy remains in solid form in equilibrium with the eutectic liquid. This multi-phase condition usefully increases viscosity of the material above the pure liquid viscosity to render the material workable for three-dimensional printing without completely solidifying. Such mixtures may also or instead be used to control viscosity in a composite with a melted metal and a high-temperature inert second phase. contemplated herein. In another aspect, an inert second phase may be used with a substantially pure eutectic alloy. This combination provides a dual advantage of the relatively low melting temperature that is characteristic of eutectic alloys, along with the desirable flow characteristics that can be imparted by an added inert second phase.

In general, where multiple metals and/or alloys or present, the "melting point" will be the highest melting point of all of the metals and alloys in the mixture (exclusive of any inert second phase or other particles), unless a different intent is explicitly provided or otherwise clear from the context. However, a working temperature range for extrusion may begin below this aggregate melting point, such as a temperature above a lowest melting point of a eutectic alloy within the metallic base where the aggregate material is in a two-phase region including a liquid and a solid.

Figure 4:
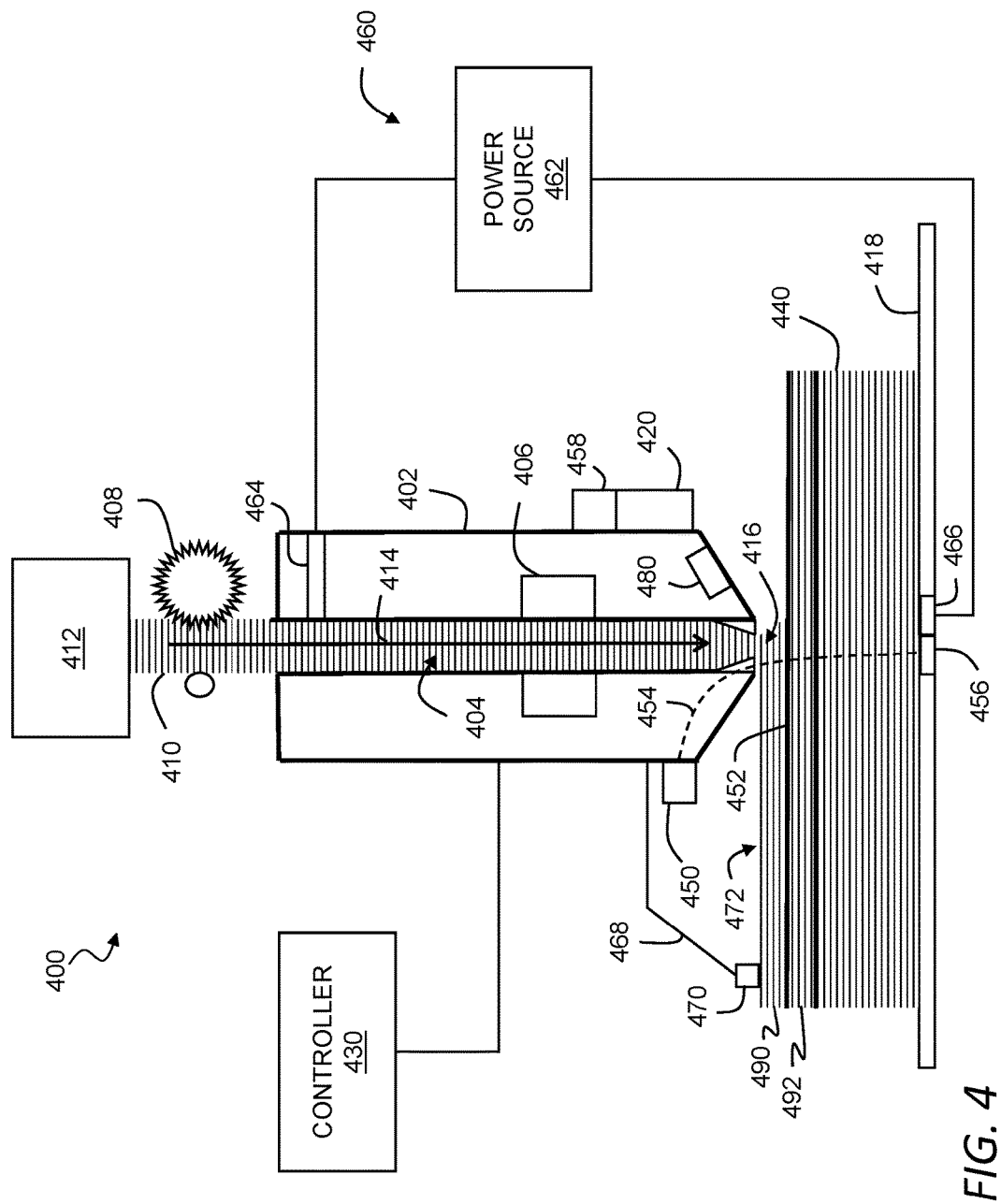
FIG. 4 shows an extruder for a printer.

FIG. 4 shows an extruder 400 for a printer. In general, the extruder 400 may include a nozzle 402, a reservoir 404, a heating system 406, and a drive system 408 such as any of the systems described above, or any other devices or combination of devices suitable for a printer that fabricates an object from a computerized model using a fused filament fabrication process and a metallic build material as contemplated herein. In general, the extruder 400 may receive a build material 410 from a source 412, such as any of the build materials and sources described herein, and advance the build material 410 along a feed path (indicated generally by an arrow 414) toward an opening 416 of the nozzle 402 for deposition on a build plate 418 or other suitable surface.

The term build material is used herein interchangeably to refer to metallic build material, species of metallic build materials, or any other build materials (such as thermoplastics). As such, references to "build material 410" should be understood to include a metallic build material 410, or a bulk metallic glass 410, or a non-eutectic composition 410, or any of the other build materials described herein, unless a more specific meaning is provided or otherwise clear from the context.

The nozzle 402 may be any nozzle suitable for the temperatures and mechanical forces required for the build material 410. For extrusion of metallic build materials, portions of the nozzle 402 (and the reservoir 404) may be formed of hard, high-temperature materials such as sapphire or quartz, which provide a substantial margin of safety for system components, and may usefully provide electrical isolation where needed for inductive or resistive heating systems.

The reservoir 404 may be a chamber or the like such as any of those described for use in a liquefaction system herein, and may receive the build material 410, such as a metallic build material, for the source 412. As described herein, the metallic build material may have a working temperature range between a solid and a liquid state where the metallic build material exhibits plastic properties suitable for extrusion. While useful build materials may exhibit a wide range of bulk mechanical properties, the plasticity of the heated build material 410 should very generally be such that the material is workable and flowable by the drive system 408, nozzle 402, and other components on one hand, while being sufficiently viscous or pasty to avoid runaway flow through the extruder 400 during deposition.

The heating system 406 may employ any of the heating devices or techniques described herein. In general, the heating system may be operable to heat the build material 410, e.g., a metallic build material, within the reservoir 404 to a temperature within the working temperature range for the build material 410.

The nozzle 402 may include an opening 416 that provides a path for the build material 410 to exit the reservoir 404 along the feed path 414 where, for example, the build material 410 may be deposited on the build plate 418.

The drive system 408 may be any drive system operable to mechanically engage the build material 410 in solid form below the working temperature range and advance the build material 410 from the source 412 into the reservoir 404 with sufficient force to extrude the build material 410, while at a temperature within the working temperature range, through the opening 416 in the nozzle 402. While illustrated as a gear, it will be understood that the drive system 408 may include any of the drive chain components described herein, and the build material 410 may be in any suitable, corresponding form factor.

An ultrasonic vibrator 420 may be incorporated into the extruder 400 to improve the printing process. The ultrasound vibrator 420 may be any suitable ultrasound transducer such as a piezoelectric vibrator, a capacitive transducer, or a micromachined ultrasound transducer. The ultrasound vibrator 420 may be positioned in a number of locations on the extruder 400 according to an intended use. For example, the ultrasound vibrator 420 may be coupled to the nozzle 402 and positioned to convey ultrasonic energy to a build material 410 such as a metallic build material where the metallic build material extrudes through the opening 416 in the nozzle 402 during fabrication.

The ultrasonic vibrator 420 may improve fabrication with metallic build materials in a number of ways. For example, the ultrasonic vibrator 420 may be used to disrupt a passivation layer (e.g., due to oxidation) on deposited material in order to improve layer-to-layer bonding in a fused filament fabrication process. An ultrasound vibrator 420 may provide other advantages, such as preventing or mitigating adhesion of a build material 410 such as a metallic build material to the nozzle 402 or an interior wall of the reservoir 404. In another aspect, the ultrasound vibrator 420 may be used to provide additional heating to the build material 410, or to induce shearing displacement within the reservoir 404, e.g., to mitigate crystallization of a bulk metallic glass.

A printer (not shown) incorporating the extruder may also include a controller 430 to control operation of the ultrasonic vibrator 420 and other system components. For example, the controller 430 may be coupled in a communicating relationship with the ultrasonic vibrator 420 (or a control or power system for same) and configured to operate the ultrasonic vibrator 420 with sufficient energy to ultrasonically bond an extrudate of a metallic build material exiting the extruder 402 to an object 440 formed of one or more previously deposited layers of the metallic build material on the build plate 418. The controller 430 may also or instead operate the ultrasonic vibrator 420 with sufficient energy to interrupt a passivation layer on a receiving surface of a previously deposited layer of the build material 410. In another aspect, the controller 430 may operate the ultrasonic vibrator with sufficient energy to augment thermal energy provided by the heating system to maintain the metallic build material at the temperature within the working temperature range within the reservoir. The controller 430 may also or instead operate the ultrasonic vibrator 420 with sufficient energy to reduce adhesion of the build material 410 to the nozzle 402 (e.g. around the opening 416) and an interior of the reservoir 404.

The extruder 400 or the accompanying printer may also include a sensor 450 that provides feedback such as a signal to the controller 430 for use in variably or otherwise selectively controlling activation of the ultrasonic vibrator 420.

In one aspect, the sensor 450 may include a sensor for monitoring a suitability of a receiving surface of a previously deposited layer of the build material 410. For example, where the build material 410 is a metallic build material, the sensor 450 may measure resistance through an interface layer 452 between build material 410 exiting the nozzle 402 and a previously deposited layer of the build material 410 in the object 440, where the resistance is measured along a current path 454 between the sensor 450 and a second sensor 456 in the build plate 418 or some other suitable circuit-forming location. Where the bond across the interface layer 452 is good, the resistance along the current path 454 will tend to be low, while a poor bond across the interface layer 452 will result in greater resistance along the current path 454. Thus, the controller 430 may be configured to dynamically control operation of the ultrasonic vibrator 420 in response to a signal from the sensor 450, e.g., a signal indicative of resistance across the interface layer 452, and to increase ultrasonic energy from the ultrasonic vibrator 420 as needed to improve fusion of the layers of build material 410 across the interface layer 452. Thus, in one aspect, the sensor 450 may measure a quality of bond between adjacent layers of a metallic build material 410 and the controller 430 may be configured to increase an application of ultrasound energy from the ultrasonic vibrator 420 in response to a signal from the sensor 450 indicating that the quality of the bond is poor.

In another aspect, the sensor 450 may be used to detect clogging of the build material 410, or crystallization of a bulk metallic glass build material, and to control the ultrasonic vibrator 420 to mitigating the detected condition. For example, the sensor 450 may include a force sensor configured to measure a force applied to the build material 420 by the drive system 408, and the controller 430 may be configured to increase ultrasonic energy applied by the ultrasonic vibrator 420 to the reservoir 404 in response to a signal from the sensor 450 indicative of an increase in the force applied by the drive system 404. The force may be measured with a mechanical force sensor, or by measuring, e.g., a power load on the drive system 408.

Where the build material 410 includes a bulk metallic glass, the ultrasonic vibrator 420 may also or instead be used to create a brittle interface to a support structure. For example, the controller 430 may be configured to operate the ultrasonic vibrator 420 with sufficient energy to liquefy the bulk metallic glass at a layer (such as the interface layer 452) between the object 440 fabricated with the bulk metallic glass from the nozzle 402 and a support structure for the object 440 fabricated with the bulk metallic glass. This technique advantageously facilitates the fabrication of breakaway support structures in arbitrary locations using a single build material.

The extruder 400 may also include a mechanical decoupler 458 interposed between the ultrasonic vibrator 420 and one or more other components of the printer to decouple ultrasound energy from the ultrasonic vibrator from the one or more other components. The mechanical decoupler 458 may, for example, include any suitable decoupling element such as an elastic material or any other acoustic decoupler or the like. The mechanical decoupler 458 may isolate other components, particularly components that might be mechanically sensitive, from ultrasound energy generated by the ultrasonic vibrator 420, and/or to direct more of the ultrasonic energy toward an intended target such as an interior wall of the reservoir 404 or the opening 416 of the nozzle 402.

Where the build material 410 is a metallic build material, the extruder 400 may also or instead include a resistance heating system 460. The resistance heating system 460 may include an electrical power source 462, a first lead 464 coupled in electrical communication with the metallic build material 410 in a first layer 490 of the number of layers of the build material 410 proximal to the nozzle 402 and a second lead 466 coupled in electrical communication with a second layer 492 of the number of layers proximal to the build plate 456, thereby forming an electrical circuit through the build material 410 for delivery of electrical power from the electrical power source 462 through an interface (e.g., at the interface layer 452) between the first layer 490 and the second layer 492 to resistively heat the metallic build material across the interface.

It will be understood that a wide range of physical configurations may serve to create an electrical circuit suitable for delivering current through the interface layer 452. For example, the second lead 466 may be coupled to the build plate 418, and coupled in electrical communication with the second layer 492 via a conductive path through the body of the object 440, or the second lead 466 may be attached to a surface of the object 440 below the interface layer 452, or implemented as a moving probe or the like that is positioned in contact the with surface of the object at any suitable position to complete a circuit through the interface layer 452. In another aspect, the first lead 466 may be coupled to a movable probe 468 controllably positioned on a surface of an object 440 fabricated with the metallic build material that has exited the nozzle 402, and may include a brush lead 470 or the like contacting a surface 472 of the build material 410 at a predetermined location adjacent to the exit 416 of the nozzle 402. The first lead 464 may also or instead be positioned in a variety of other locations. For example, the first lead 464 may couple to the build material 410 on an interior surface of the reservoir 404, or the first lead 464 may couple to the build material 410 at the opening 416 of the nozzle 402. However configured, the first lead 464 and the second lead 466 may generally be positioned to create an electrical circuit through the interface layer 452.

With this general configuration, Joule heating may be used to fuse layers of build material 410 in the object 440. In general, Joule heating may be used to soften or melt the print media at the physical interface between a build material and an object that is being manufactured. This may include driving a circuit through the interface layer 452 with variable pulsed joule and/or DC signals to increase temperature and adhere individual layers made of, e.g., a BMG or semisolid printed metal, or any other metal media with suitable thermal and electrical characteristics. A wide range of signals may be used to discharge electrical power across the interface layer 452. For example, a low voltage (e.g. less than twenty-four Volts) and high current (e.g., on the order of hundreds or thousands of Amps) may be applied in low frequency pulses of between about one Hertz and one hundred Hertz. Delivery of power may be controlled, e.g., using pulse width modulation of a DC current, or through any other suitable techniques.

Joule heating may advantageously be used for other purposes. For example, current may be intermittently applied across surfaces inside a nozzle 402 in order to melt or soften metallic debris that has solidified on interior walls, thus cleaning the nozzle 402. Thus, a technique disclosed herein may include periodically applying a Joule heating pulse across interior surfaces of a dispensing nozzle to clean and remove metallic debris. This step may be performed on a predetermined, regular schedule, or this step may be performed in response to a detection of increased mechanical resistance along the feed path 414 for the build material 410, or in response to any other suitable signal or process variable.

In general, Joule heating may be applied with constant power during a print process, or with a variable power that varies either dynamically, e.g., based on a sensed condition of an inter-layer bond, or programmatically based on, e.g., a volume flow rate, deposition surface area, or some other factor or collection of factors. Other electrical techniques may be used to similar effect. For example, capacitive discharge resistance welding equipment uses large capacitors to store energy for quick release. A capacitive discharge welding source may be used to heat an interface between adjacent layers in pulses while a new layer is being deposited. Joule heating and capacitive discharge welding may be advantageously superposed using the same circuit. In one aspect, where the build material 410 includes a bulk metallic glass, the bulk metallic glass may be fabricated with a glass former selected from the group consisting of boron, silicon, and phosphorous combined with a magnetic metal selected from the group consisting of iron, cobalt and nickel to provide an amorphous alloy with increased electrical resistance to facilitate Joule heating.

The resistance heating system 460 may be dynamically controlled according to sensed conditions during fabrication. For example, a sensor system 480 may be configured to estimate an interface temperature at an interface (e.g., the interface layer 452) between a first region of the metallic build material exiting the nozzle and a second region of the metallic build material within a previously deposited layer of the metallic build material below and adjacent to the first region. This may, for example, include a thermistor, an infrared sensor, or any other sensor or combination of sensors suitable for directly or indirectly measuring or estimating a temperature at the interface layer 452. With an estimated or measured signal indicative of the interface temperature, the controller may be configured to adjust a current supplied by the electrical power source 462 in response to the interface temperature, e.g., so that the interface layer 452 can be maintained at an empirical or analytically derived target temperature for optimum inter-layer adhesion.

Figure 5:
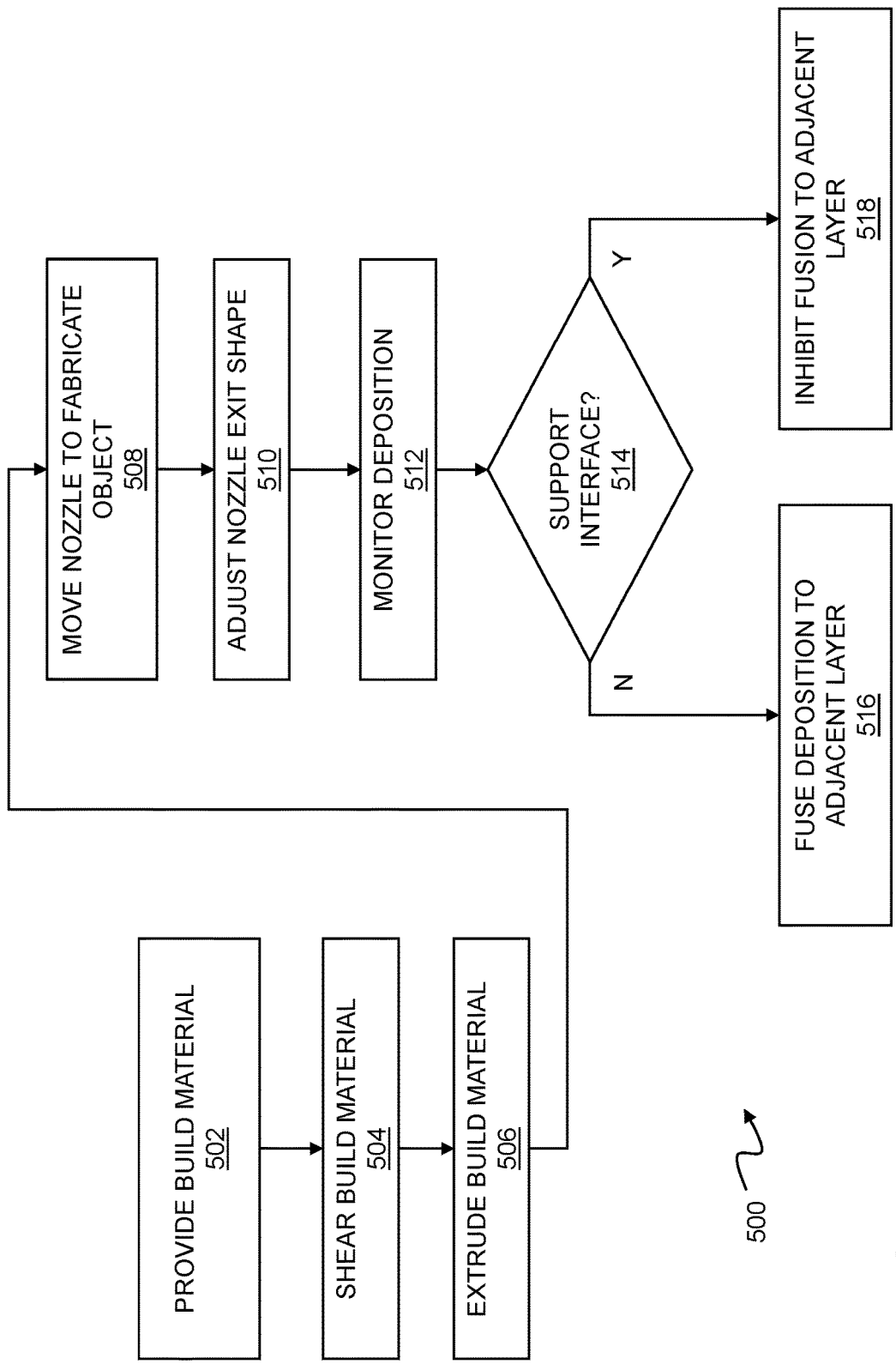
FIG. 5 shows a flow chart of a method for operating a printer in a three-dimensional fabrication of an object.

FIG. 5 shows a flow chart of a method for operating a printer in a three-dimensional fabrication of an object.

As shown in step 502, the method 500 may begin with providing a build material such as any of the build materials described herein to an extruder. By way of example, the build material may include a bulk metallic glass, a non-eutectic composition of eutectic systems, or a metallic base loaded with a high-temperature inert second phase. While the following description emphasizes the use of these types of metallic build materials with a working temperature range of plastic behavior suitable for extrusion, the build material may instead include a thermoplastic such as acrylonitrile butadiene styrene (ABS), polylactic acid (PLA), polyether ether ketone (PEEK) or any other suitable polymer or the like. In another aspect, the build material may include a binder system loaded with metallic powder or the like suitable for fused filament fabrication of green parts that can be debound and sintered into a final, metallic object.

As shown in step 504, the method 500 may optionally include shearing the build material, e.g., where the build material includes a bulk metallic glass. As further described herein, bulk metallic glasses are subject to degradation as a result of crystallization during prolonged heating. While the bulk metallic glass is heated, e.g., in the reservoir of an extruder, a shearing force may be applied by a shearing engine to mitigate or prevent crystallization. In general, this may include any technique for applying a shearing force to the bulk metallic glass within the reservoir to actively induce a shearing displacement of a flow of the bulk metallic glass along a feed path through the reservoir to the nozzle to mitigate crystallization of the bulk metallic glass while above the glass transition temperature. Where a mechanical resistance to flow of the bulk metallic glass is measured, this may be controlled dynamically. Thus, in one aspect, the method includes measuring a mechanical resistance to the flow of the bulk metallic glass along the feed path (e.g. in step 512) and controlling a magnitude of the shearing force according to the mechanical resistance.

As shown in step 506, the method 500 may include extruding the build material. This may, for example, include supplying the build material from a source, driving the build material with a drive system, heating the build material in a reservoir, and extruding the build material through a nozzle of a printer as generally described herein.

As shown in step 508, the method 500 may include moving the nozzle relative to a build plate of the printer to fabricate an object on the build plate in a fused filament fabrication process based on a computerized model of the object, or otherwise depositing the build material layer by layer to fabricate the object.

As shown in step 510, the method may include adjusting an exit shape of the nozzle. Where the nozzle includes an adjustable shape for extrusion as described herein, the shape may be periodically adjusted during fabrication according to, e.g., a desired feature size, a direction of travel of an extruder, and so forth. Thus, in one aspect, the method 500 may include varying a cross-sectional shape of an exit to the nozzle while extruding to provide a variably shaped extrudate during fabrication of the object. Varying the cross-sectional shape may include moving a plate relative to a fixed opening of a die to adjust a portion of the fixed opening that is exposed for extrusion, or applying any other mechanism suitable for controlling a cross-sectional profile of an extruder. In general, varying the cross-sectional shape may include varying at least one of a shape, a size and a rotational orientation of the cross-sectional shape.

In one aspect, the exit shape may be controlled with a number of concentric rings. For these embodiments, adjusting the exit shape may include selectively opening or closing each of the number of concentric rings while extruding to control an extrusion of one of the one or more build materials. Selectively opening or closing each of the number of concentric rings may further include opening or closing each of the number of concentric rings according to a location of the extrusion within the object, or according to a target volume flow rate of the extrusion.

As shown in step 512, the method 500 may include monitoring the deposition. This may include monitoring to obtain feedback from a sensor for controlling the printing process, such as by sensing an electrical resistance at the interface between layers as described above. This may also or instead include logging data about the build process for future use.

As shown in step 514, the method 500 may include determining whether the current layer being fabricated by the printer is an interface to a support structure for a portion of the object, which may be an immediately adjacent layer of the support structure, an immediately adjacent layer of the object, or an interstitial layer between a layer of the support structure and a layer of the object. If the current layer is not an interface to a support structure, then the method 500 may proceed to step 516 where one or more techniques may be used to improve fusion to the underlying layer. If the current layer is an interface to a support structure, then the method 500 may proceed to step 518 where other techniques are used (or withheld from use) to reduce bonding strength between layers.

As shown in step 516, the method 500 may include fusing the deposition to an adjacent, e.g., directly underlying layer. This may employ a variety of techniques, which may be used alone or in any workable combination to strengthen the interlayer bond between consecutive layers of deposited build material.

For example, fusing the layers may include applying ultrasonic energy through the nozzle to an interface between the metallic build material exiting the nozzle and the metallic build material in a previously deposited layer of the object. Where, for example, electrical resistance at the interface is monitored, this may include controlling a magnitude of ultrasonic energy based on a bond strength inferred from the electrical resistance.

As another example, fusing the layers may include applying pulses of electrical current through an interface between the metallic build material exiting the nozzle and the metallic build material in a previously deposited layer of the object, e.g., to disrupt a passivation layer, soften the material and otherwise improve a mechanical bond between the layers. This process may be performed dynamically, e.g. by measuring a resistance at the interface and controlling the pulses of electrical current based on a bond strength inferred from the resistance. Thus in one aspect, the method 500 may include depositing a first layer of a metallic build material through a nozzle of a printer, depositing a second layer of a metallic build material through the nozzle onto the first layer to create an interface between the first layer and the second layer, and applying pulses of electrical current through the interface between the first layer and the second layer to disrupt a passivation layer on an exposed surface of the first layer of metallic build material and improve a mechanical bond across the interface. As the nozzle moves relative to a build plate of the printer to fabricate an object, the method may further include measuring a resistance at the interface and controlling the pulses of electrical current based on a bond strength inferred from the resistance.

As another example, fusing the layers may include applying a normal force on the metallic build material exiting the nozzle toward a previously deposited layer of the metallic build material with a former extending from the nozzle. This process may be performed dynamically, e.g., by measuring an instantaneous contact force between the former and the metallic build material exiting the nozzle with any suitable sensor, and controlling a position of the former based on a signal indicative of the instantaneous contact force.

As shown in step 518, when a support interface is being fabricated, various techniques may be employed to weaken or reduce the bond between adjacent layers. In one aspect, this may include withholding any one or more of the fusion enhancement techniques described above with reference to step 516. Other techniques may also or instead be used to specifically weaken the fusion between layers in a support structure and an object.

Where the build material is a bulk metallic glass, a removable support structure may advantageously be fabricated by simply raising a temperature of the bulk metallic glass to crystallize the bulk metallic glass at the support interface during fabrication, thus yielding a support structure, a breakaway support interface and an object from a single build material. In general, the support structure and the object may be fabricated from the bulk metallic glass at any temperature above the glass transition temperature. When manufacturing the interface layer between these other layers, the temperature may be raised to a temperature sufficiently high to promote crystallization of the bulk metallic glass within the time frame of the fabrication process.

Thus, in one aspect there is disclosed herein a method for fabricating an interface between a support structure and an object using a bulk metallic glass. The method may include fabricating a layer of a support structure for an object from a bulk metallic glass having a super-cooled liquid region at a first temperature above a glass transition temperature for the bulk metallic glass, fabricating an interface layer of the bulk metallic glass on the layer of support structure at a second temperature sufficiently high to promote crystallization of the bulk metallic glass during fabrication, and fabricating a layer of the object on the interface layer at a third temperature below the second temperature and above the glass transition temperature. It should be understood that "fabricating" in this context may include fabricating in a fused filament fabrication process or any other process that might benefit from the manufacture of breakaway support by crystallization of a bulk metallic glass. Thus, for example, a breakaway support structure may be usefully fabricated using these techniques in an additive manufacturing process based on laser sintering of bulk metallic glass powder, or any other additive process using bulk metallic glasses.

Similarly, there is disclosed herein a three-dimensional printer, which may be any of the printers described herein, that uses the above technique to fabricate support, an object, and an interface for breakaway support. Thus, there is disclosed herein a printer for three-dimensional fabrication of metallic objects, the printer comprising: a nozzle configured to extrude a bulk metallic glass having a super-cooled liquid region at a first temperature above a glass transition temperature for the bulk metallic glass; a robotic system configured to move the nozzle in a fused filament fabrication process to fabricate a support structure and an object based on a computerized model; and a controller configured to fabricate an interface layer between the support structure and the object by depositing the bulk metallic glass in the interface layer at a second temperature greater than the first temperature, the second temperature sufficiently high to promote crystallization of the bulk metallic glass during fabrication.

In another aspect, the interface between the support structure and the object may be deposited at a somewhat elevated temperature that does not substantially crystallize the interface, but simply advances the material in that region further toward crystallization within the TTT cooling curve than the remaining portions of the object and/or support. This resulting object may be subsequently heated using a secondary heating process (e.g., by baking at elevated temperature) to more fully crystallize the interface layer before the body of the object, thus leaving the object in a substantially amorphous state and the interface layer in a substantially crystallized state. Thus, the method may include partially crystallizing the interface layer, or advancing the interface layer sufficiently toward crystallization during fabrication to permit isolated crystallization of the interface layer without crystalizing the object in a secondary heating process.

In another aspect, the interface may be inherently weakened by fabricating the support structure and the object from two thermally mismatched bulk metallic glasses. By using thermally mismatched bulk metallic glasses for an object and adjacent support structures, the interface layer between these structures can be melted and crystallized to create a more brittle interface that facilitates removal of the support structure from the object after fabrication. More specifically, by fabricating an object from a bulk metallic glass that has a glass transition temperature sufficiently high to promote crystallization of another bulk metallic glass used to fabricate the support structure, the interface layer can be crystallized to facilitate mechanical removal of the support structure from the object.

Thus, in one aspect, there is disclosed a method for controlling a printer in a three-dimensional fabrication of a metallic object from a bulk metallic glass, and more specifically for using two different bulk metallic glasses with different working temperature ranges to facilitate fabrication of breakaway support structures. The method may include the steps of fabricating a support structure for an object from a first bulk metallic glass having a first super-cooled liquid region, and fabricating an object on the support structure from a second bulk metallic glass different than the first bulk metallic glass, where the second bulk metallic glass has a glass transition temperature sufficiently high to promote a crystallization of the first bulk metallic glass during fabrication, and where the second bulk metallic glass is deposited onto the support structure at a temperature at or above the glass transition temperature of the second bulk metallic glass to induce crystallization of the support structure at an interface between the support structure and the object. The printer may be a fused filament fabrication device, or any other additive manufacturing system suitable for fabricating a support from a first bulk metallic glass and an object from a second bulk metallic glass in a manner consistent with crystallization of the interface as contemplated herein.

As with the single-material technique described above, the resulting object and support structure may be subjected to a secondary process to heat and fully crystallize the interface layer interposed between these two.

The second bulk metallic glass may have a glass transition temperature above a critical crystallization temperature of the first bulk metallic glass, and the method may include heating the second bulk metallic glass to a second temperature above the critical crystallization temperature of the first bulk metallic glass before deposition onto the first bulk metallic glass. The crystallization of the first bulk metallic glass yields a fracture toughness at the interface not exceeding twenty MPa$\sqrt{m}$. While the interface layer and some adjacent portion of the support structure may be usefully fabricated from the first bulk metallic glass to facilitate crystallization of the interface layer, underlying layers of the support structure may be fabricated from a range of other, potentially less expensive, materials. Thus, in one aspect fabricating the support structure may include fabricating a base of the support structure from a first material, and an interface layer of the support structure between the base and the object from the first bulk metallic glass. The method may also generally include removing the support structure from the object by fracturing the support structure at the interface where the first bulk metallic glass is crystallized.

Many systems of glass forming alloys may be used to obtain thermally mismatched pairs suitable for fabricating a brittle interface layer. For example, the low-temperature support structure may be fabricated from a magnesium-based bulk metallic glass. The magnesium-based metallic glass for supports may, for example, contain one or more of calcium, copper, yttrium, silver or gadolinium as additional alloying elements. The magnesium-based glass may, for example, have the composition: $Mg_{65}Cu_{25}Y_{10}$, $Mg_{54}Cu_{28}Ag_7Y_{11}$. The object may be fabricated from a relatively high-temperature bulk metallic glass containing, e.g., zirconium, iron, or titanium-based metallic glass. For example, the high-temperature alloy may include a zirconium-based alloy containing one or more of copper, and may contain copper, nickel, aluminum, beryllium or titanium as additional alloying elements. As more specific examples, a zirconium-based alloy may include any one of $Zr_{35}Ti_{30}Cu_{8.25}Be_{26.7}$, $Zr_{60}Cu_{20}Ni_8Al_7Hf_3Ti_2$, or $Zr_{65}Cu_{17.5}Ni_{10}Al_{7.5}$. An iron-based high-temperature alloy may include $(Co_{0.5}Fe_{0.5})_{62}Nb_6Dy_2B_{30}$, $Fe_{41}Cr_{15}Co_7C_{12}B_7Y_2$ or $Fe_{55}Co_{10}Ni_5Mo_5P_{12}C_{10}B_5$. Still more specifically, a useful pair of alloys include $Zr_{58.5}Nb_{2.8}Cu_{15.6}Ni_{12.8}Al_{10.3}$ with a glass transition temperature of about four hundred degrees Celsius and $Zr_{44}Ti_{11}Cu_{10}Ni_{10}Be_{25}$ with a glass transition temperature of about three-hundred fifty degrees Celsius. As another example, $Fe_{48}Cr_{15}Mo_{14}Er_2C_{15}B_6$ has a glass transition temperature of about five-hundred seventy degrees Celsius and $Zr_{65}Al_{10}Ni_{10}Cu_{15}$ has a glass transition temperature of about three-hundred seventy degrees Celsius, thus providing approximately a two-hundred degree processing margin, which may be useful, for example, in contexts where substantial cooling takes place shortly after deposition.

Figure 6:
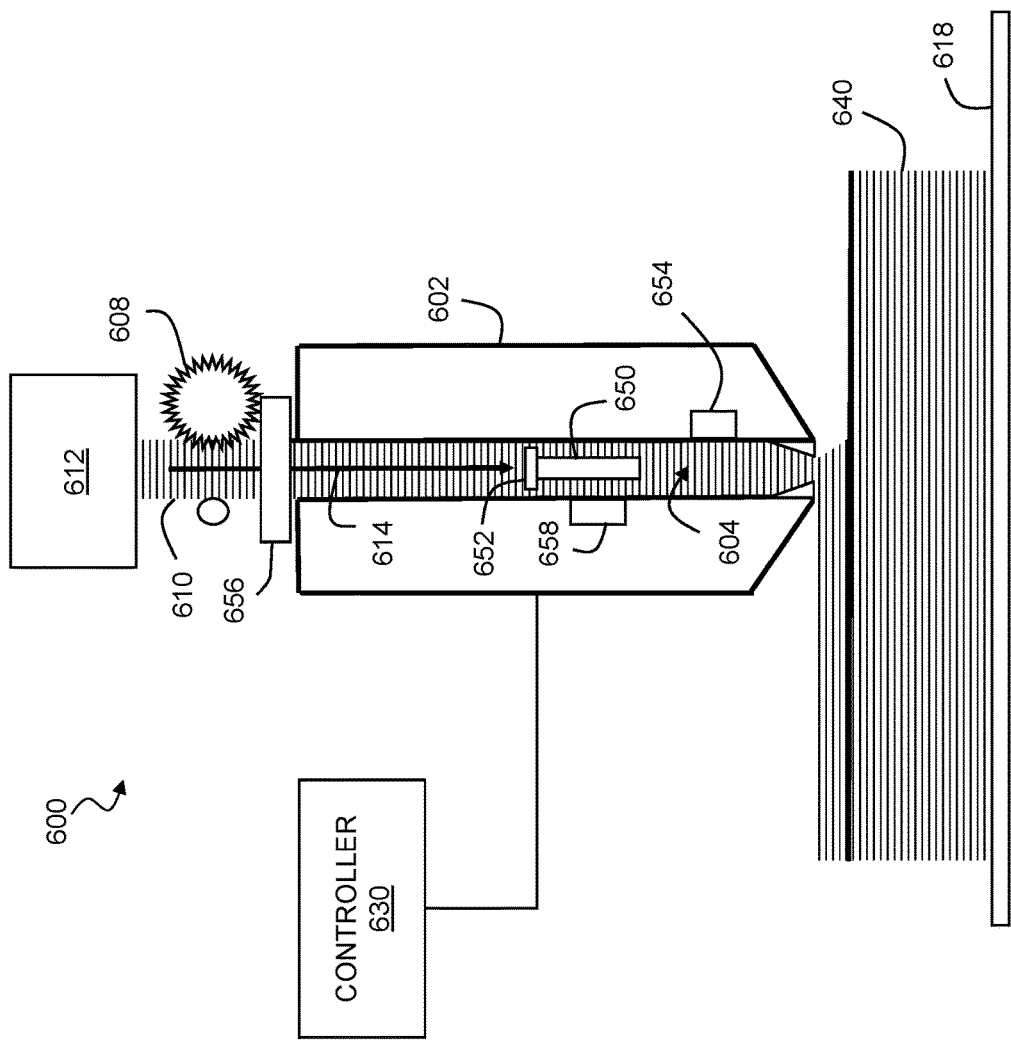
FIG. 6 shows a shearing engine for a three-dimensional printer.

FIG. 6 shows a shearing engine for a three-dimensional printer. In general, an extruder 600 for a printer such as a bulk metallic glass printer may include a source 612 a build material 610 that is advanced by a drive system 608 through a reservoir 604 and out the opening 616 of a nozzle 602 to form an object 640 on a build plate 618, all as generally described above. A controller 630 may control operation of the extruder 600 and other printer components to fabricate the object 640 from a computerized model.

A shearing engine 650 may be provided within the feed path for the build material 610 (e.g., a bulk metallic glass) to actively induce a shearing displacement of the bulk metallic glass to mitigate crystallization. This may advantageously extend a processing time for handling the bulk metallic glass at elevated temperatures. In general, the shearing engine 650 may include any mechanical drive configured to actively induce a shearing displacement of a flow of the bulk metallic glass along the feed path 614 through the reservoir 604 to mitigate crystallization of the bulk metallic glass while above the glass transition temperature.

In one aspect, the shearing engine 650 may include an arm 652 positioned within the reservoir 604. The arm 652 may be configured to move and displace the bulk metallic glass within the reservoir 604, e.g., by rotating about an axis of the feed path 614. The shearing engine may include a plurality of arms, such as two, three or four arms, which may be placed within a single plane transverse to the axis of the feed path 614, or staggered along the axis to encourage shearing displacement throughout the axial length of the reservoir 604. The shearing engine 650 may also or instead include one or more ultrasonic transducers 654 positioned to introduce shear within the bulk metallic glass 610 in the reservoir 604. The shearing engine 650 may also or instead include a rotating clamp 656. The rotating clamp 656 may be any combination of clamping or gripping mechanisms mechanically engaged with the bulk metallic glass 610 as the bulk metallic glass 610 enters the reservoir 604 at a temperature below the glass transition temperature and configured to rotated the bulk metallic glass 610 to induce shear as the bulk metallic glass 610 enters the reservoir 604. This may for example include a collar clamp, shaft collar or the like with internal bearings to permit axial motion through the rotating clamp while preventing rotational motion within the clamp. By preventing rotational motion, the rotating clamp 656 can exert rotational force on the build material 610 in solid form. The source 612 of build material 610 may also rotate in a synchronized manner to prevent an accumulation of stress within the build material 610 from the source that might mechanically disrupt the build material 610 as it travels from the source 612 to the reservoir 604.

The shearing engine 650 may be usefully controlled according to a variety of feedback signals. In one aspect, the extruder 600 may include a sensor 658 to detect a viscosity of the build material 610 (e.g., bulk metallic glass) within the reservoir 604, and the controller 630 may be configured to vary a rate of the shearing displacement by the shearing engine 650 according to a signal from the sensor 658 indicative of the viscosity of the bulk metallic glass. This sensor 658 may, for example, measure a load on the drive system 608, a rotational load on the shearing engine 650, or any other parameter directly or indirectly indicative of a viscosity of the build material 610 within the reservoir 604. In another aspect, the sensor 658 may include a force sensor configured to measure a force applied to the bulk metallic glass 610 by the drive system 608, and the controller 630 may be configured to vary a rate of the shearing displacement by the shearing engine 650 in response to a signal from the force sensor indicative of the force applied by the drive system 650. In another aspect, the sensor 658 may be a force sensor configured to measure a load on the shearing engine 650, and the controller 630 may be configured to vary a rate of the shearing displacement by the shearing engine in response to a signal from the force sensor indicative of the load on the shearing engine 650. In general, crystallization may be inferred when a viscosity of the bulk metallic glass above the glass transition temperature exceeds about $10^{\wedge}12$ poise-seconds. Any suitable mechanism for directly or indirectly measuring or estimating viscosity for comparison to this threshold may be usefully employed to provide a sensor signal for controlling operation of the shearing engine 650 as contemplated herein.

Figure 7:
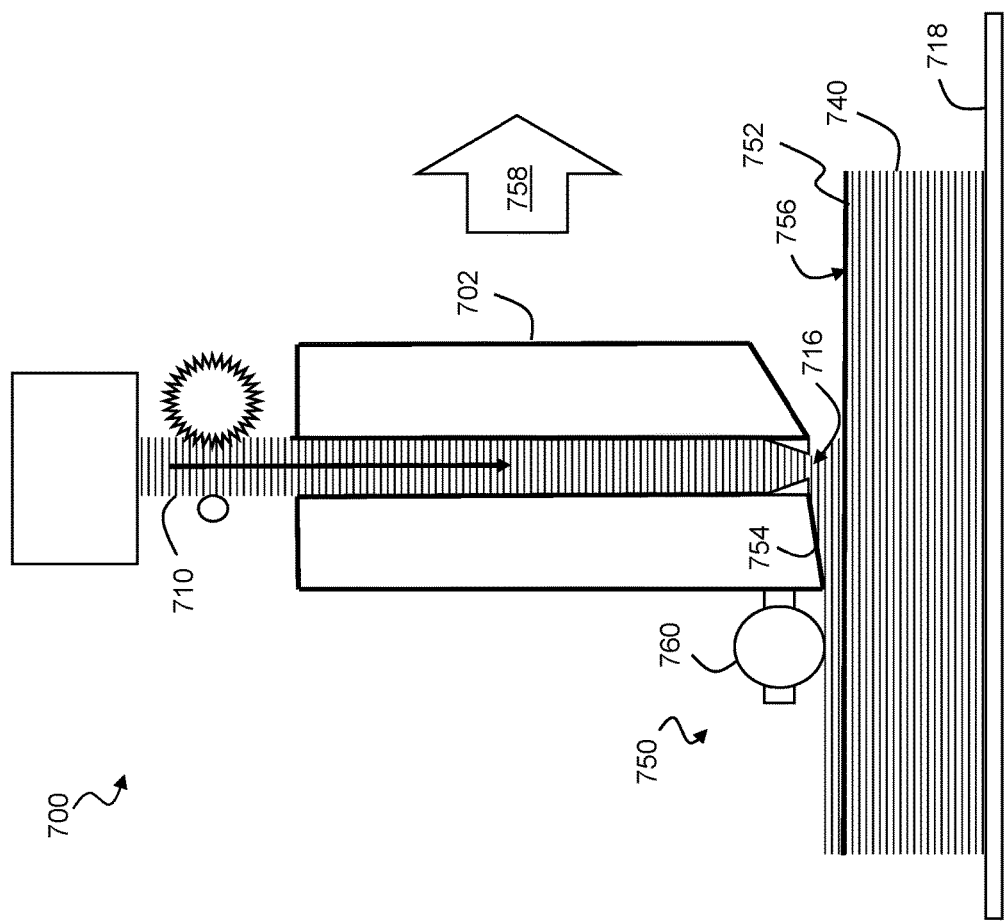
FIG. 7 shows an extruder with a layer-forming nozzle exit.

FIG. 7 shows an extruder with a layer-forming nozzle exit. In general, an extruder 700 such as any of the extruders described above may include a former 750 extending from the nozzle 702 to supplement a layer fusion process by applying a normal force on build material 710 as it exits the nozzle 702 toward a previously deposited layer 752 of the build material 710.

In one aspect, the former 750 may include a forming wall 754 with a ramped surface that inclines downward from the opening 716 of the nozzle 702 toward the surface 756 of the previously deposited layer 752 to create a downward force as the nozzle 702 moves in a plane parallel to the previously deposited surface 756, as indicated generally by an arrow 758. The forming wall 754 may also or instead present a cross-section to shape the build material 710 in a plane normal to a direction of travel of the nozzle 702 as the build material 710 exits the nozzle 702 and joins the previously deposited layer 752. This cross-section may, for example include a vertical feature such as a vertical edge or curve positioned to shape a side of the build material as the build material exits the opening. With a vertical feature of this type, the forming wall 754 may trim and/or shape bulging and excess deposited material to provide a well-formed, rectangular cross-sectional shape to roads of material deposited in a fused filament fabrication process, which may improve exterior finish of the object 740 and provide a consistent, planar top surface 756 to receive a subsequent layer of the build material 710.

The former 750 may also or instead include a roller 760 positioned to apply the normal force. The roller 760 may be a heated roller, and may include a rolling cylinder, a caster wheel, or any other roller or combination of rollers suitable for applying continuous, rolling normal force on the deposited material.

In one aspect, a non-stick material having poor adhesion to the build material may be disposed about the opening 716 of the nozzle 702, particularly on a bottom surface of the nozzle 702 about the opening 716. For metallic build materials, useful non-stick materials may include a nitride, an oxide, a ceramic, or a graphite. The non-stick material may also include any material with a reduced microscopic surface area that minimizes loci for microscopic mechanical adhesion. The non-stick material may also or instead include any material that is poorly wetted by the metallic build material.

Figure 8:
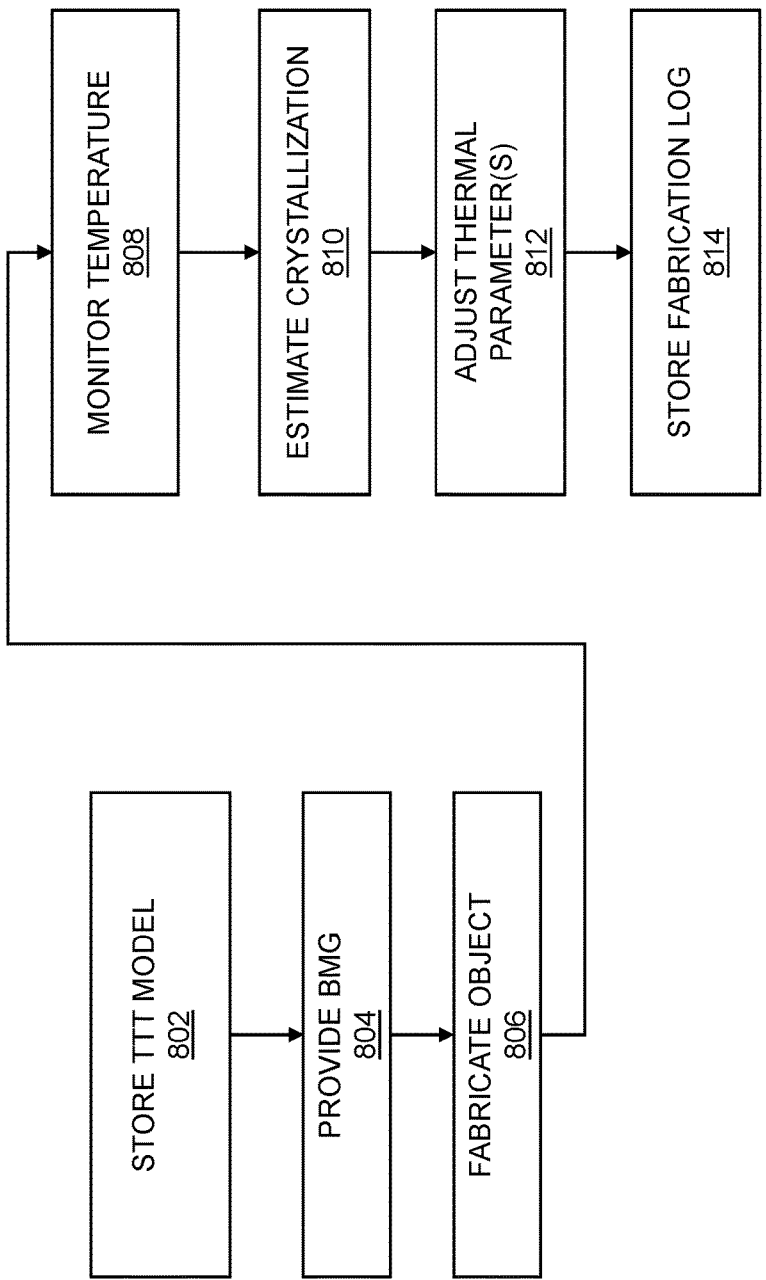
FIG. 8 is a flowchart of a method for controlling a printer based on temporal and spatial thermal information for a build material in an additive manufacturing process.

FIG. 8 is a flowchart of a method for controlling a printer based on temporal and spatial thermal information for a build material in an additive manufacturing process. In general, A thermal history of the object over time may be maintained, e.g., on a voxel-by-voxel basis. For bulk metallic glasses, this information may be usefully employed in order to maintain a thermal budget for an object that is suitable for preserving the amorphous, uncrystallized state of the bulk metallic glass, and to provide a record for prospective use and analysis of the object. For example, the thermal budget may indicate potentially crystallized regions within an object, or other thermally-related defects. As such, the following description emphasis the use of thermal history in fabrication processes using bulk metallic glasses. However, the following method is more generally applicable to any build material or combination of build materials that might benefit from detailed spatial information about thermal history, such as where the build material is susceptible to thermal degradation or has thermally controlled properties.

As shown in step 802, the method 800 may include storing a model for a rate of crystallization of a bulk metallic glass according to time and temperature. The model may, for example, be based on a corresponding time temperature transformation cooling curve for the bulk metallic glass and any other relevant analytic or empirical data. The model may, for example, be stored in a memory of the control system for the printer, or any other location suitable for use as contemplated herein.

As shown in step 804, the method 800 may include providing a source of the bulk metallic glass in a predetermined state relative to the model. Commercially available bulk metallic glasses are not typically provided with specifications related to actual or possible thermal degradation. However, in a fused filament fabrication process, the bulk metallic glass may be exposed to elevated temperatures (e.g., above the glass transition temperature) for extended periods. In this context, it is important to know the state of the material within the TTT cooling curve in order to properly budget for continued thermal exposure going forward and predict when significant crystallization may begin. Where this information is not obtained from a supplier of the bulk metallic glass, it may be determined through experimentation for a particular sample of the material.

As shown in step 806, the method 800 may include fabricating an object using an additive manufacturing process. The build material may be a bulk metallic glass or any other build material subject to thermal degradation or otherwise deriving manufacturing benefit from a spatial and temporal thermal history. The additive manufacturing process may include a fused filament fabrication process or any other fabrication process that exposes a material such as a bulk metallic glass to prolonged periods of elevated temperatures.

As shown in step 808, the method 800 may include monitoring a temperature of the bulk metallic glass on a voxel-by-voxel basis as the bulk metallic glass is heated and deposited to form the object. This may include monitoring using any of the temperature sensors or sensor systems described herein, as well as estimates of interior temperatures for an object based on, e.g., physical modeling or any other suitable techniques. For static voxels, e.g., those within a fabricated object, this may include modeling of heat flow through the object based on temperature measurements of the exterior surfaces, or one or more ambient temperatures or the like. For dynamic voxels, e.g., those that are moving through an extruder, this may further include modeling of flows such as a viscous flow of material within the reservoir of the extruder, to estimate displacement of material as it moves through the extrusion process. The extruder may also or instead be instrumented to track movement within the reservoir using any of a number of flow measurement techniques. The temperature may be monitored in any increments consistent with accurate estimation of volumetric temperature and processing capabilities of the printer and control system. In one aspect, monitoring the temperature includes measuring a surface temperature of the bulk metallic glass. Monitoring the temperature may also or instead include estimating a temperature of the bulk metallic glass based on one or more sensed parameters. Monitoring the temperature may also or instead include monitoring the temperature of the bulk metallic glass prior to deposition. Monitoring the temperature may also or instead include monitoring the temperature includes monitoring the temperature of the bulk metallic glass after deposition in the object.

As shown in step 810, the method 800 may include estimating a degree of crystallization for a voxel of the bulk metallic glass, generally by applying the thermal trajectory—the history of temperature over time—to the model to determine a cumulative degree of crystallization.

As shown in step 812, the method 800 may include adjusting a thermal parameter of the additive manufacturing process when the degree of crystallization for the voxel of the bulk metallic glass exceeds a predetermined threshold. This may, for example, include adjusting at least one of a pre-deposition heating temperature, a build chamber temperature, and a build plate temperature of the additive manufacturing process. Adjusting the thermal parameter may also or instead include directing a cooling fluid toward a surface of the object, such as where the thermal budget for a corresponding portion of the object is near a maximum thermal budget or is predicted to exceed the maximum thermal budget if no cooling is applied during fabrication.

As shown in step 814, the method 800 may include storing a fabrication log for the fabrication of the object. The fabrication log may store any information usefully derived from temperature monitoring such as a degree of crystallization for each voxel of the object or a thermal history for each voxel of the object.

Figure 9:
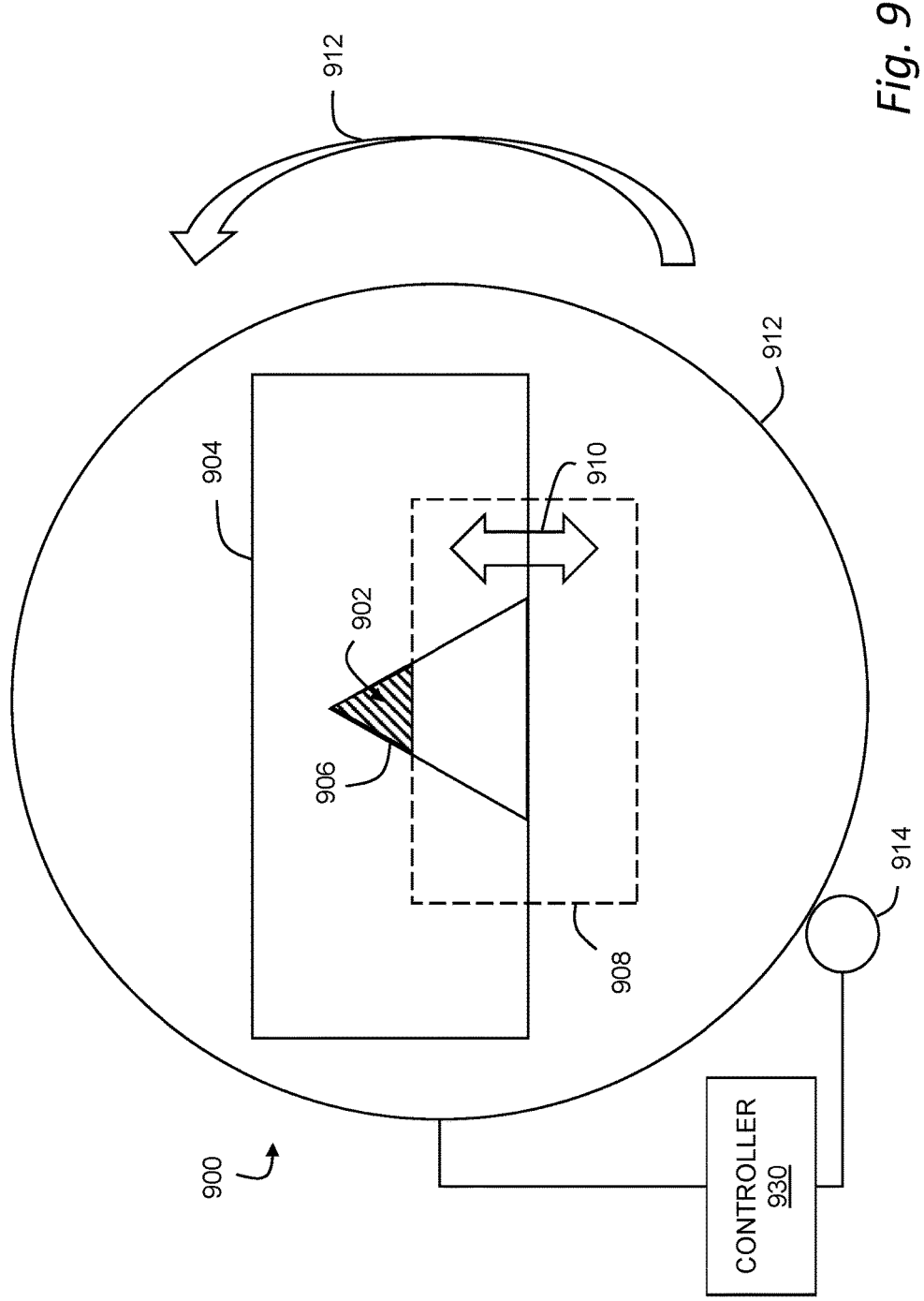
FIG. 9 shows a nozzle with a controllable shape.

FIG. 9 shows a nozzle with a controllable shape. In particular, the nozzle 900 is depicted in a plane normal to a feed path of build material exiting an extruder. In general, the nozzle 900 may include a variable opening 902 that provides a path for a build material to exit a reservoir of an extruder. The variable opening 902 may be formed between a plate 904 with an opening 906 (such as a wedge, notch, rectangle or other suitable shape) and a die 908 that can slide relative to the plate 904 to adjust a size of the variable opening 902 by adjusting a portion of the opening 906 that is exposed for extrusion. The movement of the die 908 relative to the plate 904 is generally indicated by a first arrow 910. This permits the size of a road or line of material to be adjusted dynamically during fabrication.

In one aspect, this feature may be used to control the extrusion feature size. Thus, a controller 930 such as any of the controllers described herein may be coupled to the nozzle 900 and configured to adjust a size of the variable opening 902 according to a target feature size for an object fabricated by a three-dimensional printer using the nozzle 900. The controller 930 may also or instead adjust a size of the variable opening 902 to increase an extrusion cross section during fabrication of one or more interior structures for an object and to decrease the extrusion cross section during fabrication of one or more exterior structures for the object. Thus, infill or other interior structures may be fabricated more quickly with larger and potentially thicker road sizes, while exterior surfaces may be fabricated using smaller road sizes that afford finer feature resolution. Similarly, the controller 930 may be configured to adjust a size of the variable opening to increase an extrusion cross section during fabrication of a support structure for an object and to decrease the extrusion cross section during fabrication of one or more exterior structures for the object.

In another aspect, the controller 930 may be configured to use the variable opening 902 to control a volume flow rate from the nozzle 900. This may include incrementally increasing or decreasing the size of the variable opening 902, or fully closing the variable opening 902 to terminate an extrusion of a build material, e.g., at the end of the build or during a movement that does not require deposition. In this latter instance, the mechanical termination of flow may usefully mitigate oozing, leakage or other physical artifacts that may arise during starting and stopping of extrusion.

The nozzle 900 may also or instead include a rotating mount 912 that rotationally couples the nozzle 900 to a three-dimensional printer, along with a rotating drive 914 such as a direct drive, belt drive, or the like operable by the controller 930 to control a rotational orientation of the variable opening 902. Thus, the nozzle 900 may provide a controllable rotational orientation as indicated by a second arrow 912. This may usefully orient a non-circular bead of build material as x-y plane movements change direction during fabrication of a layer of an object so that a consistent shape or profile may be deposited independent of direction. It will be appreciated that while a triangle is shown, other shapes may also or instead be usefully employed including, without limitation, a semi-circle or other circular segment, an ellipse, a square and so forth.

It is generally contemplated that the nozzle 900 would be maintained in a consistent orientation relative to the direction of travel of the nozzle 900 within an x-y plane of the build chamber. That is, as the direction changes, the orientation of the nozzle 900 would also change in order to provide a consistent physical profile for extrusion of material. However, other effects may be usefully achieved by rotating the nozzle 900 relative to the direction of travel, e.g., in order to create thinner, wider bead of material in areas of a layer, or throughout a particular layer.

FIG. 10 shows a nozzle for controlling diameter of an extrudate. In general, FIG. 10 depicts a cross section of a nozzle 1000 of an extruder in a plane where build material exits during extrusion. The nozzle 1000 may include a number of openings formed by a number of concentric rings 1002, 1004 providing paths for a build material to extrude from the nozzle 1000 in a fabrication process for an object. While two rings are illustrated, any number of such rings may be employed. The build material may be selectively delivered to one or more of the rings according to the diameter of the bead of material that is to be delivered, e.g., by opening and closing the rings 1002, 1004, or by independently controlling a drive system used to propel build material through each one of the rings 1002, 1004. Using this technique, a printer can independently control a volumetric deposition rate and the cross-sectional size of a bead of extrudate during fabrication. By supplying different types of build materials to each of the concentric rings 1002, 1004 it is also possible to provide rapid material switching or continuous material mixing during additive manufacturing.

A number of variations to this basic geometry may be employed. For example, two or more of the number of openings may be at different z-axis heights relative to a build platform (or other fabrication surface) of a printer that uses the nozzle 1000. For example, an interior opening may have a higher or lower z-axis position than an adjacent exterior opening. The height of each opening may also be adjustable. This may facilitate the use of a variable-deposition size process where, for example, any exterior concentric rings that are not extruding can be lifted up (along the z-axis) and out of the way of rings of the nozzle 1000 that are currently depositing material.

It should also be appreciated that, while circular openings are depicted, any openings that are generally oriented around a z-axis through the nozzle 1000 may also or instead be employed. Thus, for example, the openings may be ovoid, square, triangular or the like, or each opening may have a different shape. Thus, while circular rings are one useful geometry for concentric openings, it should be understood that the term "rings" as used in this context is intended to describe any geometric shape(s) encircling a z-axis through the nozzle 1000 of a printer.

A controller 1030 such as any of the controllers described above may be operatively coupled to the nozzle 1000 to selectively extrude the build material from the number of concentric rings 1002, 1004 such as by controlling exposure of the concentric rings 1002, 1004 for extrusion, or by controlling a drive system that advances build material through an extruder and out the nozzle 1000. The nozzle 1000 may, for example, include one or more dies 1006 or the like that can slide as indicated by an arrow 1008 to selectively control exposure of the number of concentric rings 1002, 1004 for extrusion. The concentric rings 1002, 1004 may also be coupled to a number of sources of build material, such as any of the sources of build material described above, where each of sources of build material independently supplies a build material to a corresponding one of the number of concentric rings 1002, 1004.

The controller 1030 may use the concentric rings 1002 to controllably adjust an extrusion from the nozzle 1000. For example, the controller may be configured, e.g., by computer executable code, to adjust a size of extrusion from the nozzle 1000 by selectively extruding through one or more of the number of concentric rings 1002, 1004. The controller 1030 may also or instead be configured to selectively extrude through one or more of the number of concentric rings 1002, 1004 to increase an extrusion cross section during fabrication of one or more interior structures for an object and to decrease the extrusion cross section during fabrication of one or more exterior structures for the object. The controller 1030 may also or instead be configured to selectively extrude through one or more of the number of concentric rings 1002, 1004 to increase an extrusion cross section during fabrication of a support structure for the object and to decrease the extrusion cross section during fabrication of one or more exterior structures for the object.

Other control techniques may also be implemented. For example, with multiple build materials, the concentric rings 1002, 1004 may be controlled by the controller 1030 to switch among different build materials, or to mix different build materials. This may also be used to fabricate composite objects. For example, a center one of the concentric rings 1004 may provide an electrical conductor and an outer one of the concentric rings 1002 may provide an electrical insulator. The conductor may be selectively dispensed to provide conductive traces through an object that is otherwise electrically non-conductive. Other properties such as magnetic properties or thermal properties may similarly be controlled through selective extrusion of multiple materials through concentric rings 1002, 1004 of a nozzle.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
    heating a wire form of a build material from a first temperature to a second temperature as the wire form of the build material moves, in a direction toward a first nozzle, along a feed path extending from a source of the wire form of the build material to the first nozzle, the build material including a metal powder dispersed in a binder system;
    at a working temperature greater than the second temperature, extruding the build material through the first nozzle and in a direction toward a build plate, the build material extruded through the first nozzle forming a three-dimensional object on the build plate; and
    through a second nozzle, extruding a support material including the metal powder through the second nozzle toward the build plate, the support material forming supports supporting at least a portion of the three-dimensional object on the build plate as the three-dimensional object is formed, wherein a volumetric concentration of the metal powder in the build material is greater than a volumetric concentration of the metal powder in the support material.

2. The method of claim 1, wherein the support material is different from the build material.

3. The method of claim 1, wherein a concentration of the metal powder in the build material is greater than 50 percent by volume.

4. The method of claim 1, wherein the support material includes a polymer thermally compatible with the binder system.

5. The method of claim 1, wherein the support material includes an oxygen getter.

6. The method of claim 1, wherein the support material includes a zirconium powder.

7. The method of claim 1, wherein the support material is formed of a thermoplastic material.

8. The method of claim 1, wherein the wire form of the build material is in a brittle state at the first temperature and the wire form of the build material is in a plastic state at the second temperature.

9. The method of claim 8, wherein the wire form of the build material in the brittle state is in a spool.

10. The method of claim 9, wherein the wire form of the build material is unspooled as the wire form of the build material is heated from the first temperature to the second temperature.

11. The method of claim 1, wherein heating the wire form of the build material from the first temperature to the second temperature includes resistively heating the filament of the build material through contact pads disposed along the feed path.

12. The method of claim 1, wherein heating the wire form of the build material from the first temperature to the second temperature includes inductively heating the filament of the build material via one or more electromagnets disposed along the feed path.

13. The method of claim 1, wherein heating the wire form of the build material from the first temperature to the second temperature includes directing heat into the wire form of the build material via at least one portion of a drive train in contact with the wire form of the build material moving along the feed path.

14. The method of claim 1, wherein, at the working temperature, the build material is a paste having non-Newtonian fluid properties.

15. The method of claim 1, wherein extruding the build material through the first nozzle and in the direction toward the build plate includes moving the first nozzle along an extrusion path relative to the build plate.

16. The method of claim 1, further comprising debinding the binder system from the three-dimensional object to form a brown part.

17. The method of claim 16, wherein the binder system includes a bulk binder and a backbone binder and debinding the binder system from the three-dimensional object includes removing the bulk binder and the backbone binder separately from the three-dimensional object.

18. The method of claim 16, further comprising densifying the metal powder in the brown part to form a final part.

19. The method of claim 18, wherein densifying the metal powder in the brown part includes sintering the metal powder in the brown part.

20. The method of claim 1, further comprising heating the nozzle to maintain the working temperature of the build material during extrusion of the build material through the nozzle.

21. The method of claim 1, further comprising extruding an interface material through the second nozzle toward the build plate, at least a portion of the extrusion of the interface material disposed between the build material and the support material.

22. The method of claim 21, wherein the interface material resists sintering.

23. The method of claim 21, further comprising sintering the three-dimensional object, the support material, and the interface material, wherein sintering the interface material forms a brittle interface between at least a portion of the three-dimensional object and the support material.

24. The method of claim 1, further comprising extruding an interface material through a third nozzle toward the build plate, at least a portion of the extrusion of the interface material disposed between the build material and the support material.

* * * * *